US012717027B2

(12) United States Patent
Nekoui et al.

(10) Patent No.: US 12,717,027 B2
(45) Date of Patent: Aug. 25, 2026

(54) VEHICLE-TO-EVERYTHING (V2X) ASSISTED INTEGRATED SENSING AND COMMUNICATION

(71) Applicant: QUALCOMM Incorporated, San Diego, CA (US)

(72) Inventors: Mohammad Nekoui, Escondido, CA (US); Soumya Das, San Diego, CA (US)

(73) Assignee: QUALCOMM Incorproated, San Diego, CA (US)

( * ) Notice: Subject to any disclaimer, the term of this patent is extended or adjusted under 35 U.S.C. 154(b) by 209 days.

(21) Appl. No.: 18/791,976

(22) Filed: Aug. 1, 2024

(65) Prior Publication Data

US 2026/0036693 A1 Feb. 5, 2026

(51) Int. Cl.
*G01S 13/931* (2020.01)
*G01S 7/00* (2006.01)
*H04W 16/14* (2009.01)

(52) U.S. Cl.
CPC ............ *G01S 13/931* (2013.01); *G01S 7/006* (2013.01); *H04W 16/14* (2013.01); *G01S 2013/9316* (2020.01)

(58) Field of Classification Search
CPC .................. G01S 13/931; G01S 7/006; G01S 2013/9316; H04W 16/14; H04W 4/40; H04W 4/44; G08G 1/0116
USPC ........................................................ 342/52
See application file for complete search history.

(56) References Cited

U.S. PATENT DOCUMENTS 10,684,352 B2 * 6/2020 El Assaad ................. G01S 5/14
11,079,470 B2 * 8/2021 Lien ........................ G01S 13/34
12,279,154 B1 * 4/2025 Park ....................... G07C 5/008
2006/0164292 A1 * 7/2006 Buechler ................ G01S 7/006 342/52
2020/0033147 A1 * 1/2020 Ahn .................. G01C 21/3415
(Continued)

FOREIGN PATENT DOCUMENTS

EP 3726923 A1 * 10/2020 .............. H04W 4/40
EP 4024994 A1 * 7/2022 ......... H04L 27/2675
(Continued)

OTHER PUBLICATIONS

International Search Report and Written Opinion—PCT/US2025/039791—ISA/EPO—Nov. 24, 2025.

*Primary Examiner* — Nuzhat Pervin
(74) *Attorney, Agent, or Firm* — Muncy, Geissler, Olds & Lowe, P.C.

(57) ABSTRACT

Disclosed are techniques for integrated sensing and communication (ISAC). In some aspects, a network node may receive, from a road side unit (RSU), a plurality of basic safety messages (BSMs) transmitted by a plurality of vehicles. The network node may receive, from a first vehicle of the plurality of vehicles, a scheduling request to perform one or more sensing operations, one or more communication operations, or a combination of the one or more sensing operations and the one or more communication operations. The network node may transmit, to the first vehicle, a first configuration to perform the one or more sensing operations, the one or more communication operations, or the combination based on the plurality of BSMs and one or more scheduling requests from one or more other vehicles of the plurality of vehicles.

30 Claims, 22 Drawing Sheets

(56) References Cited

U.S. PATENT DOCUMENTS

| | | | | |
|---|---|---|---|---|
| 2020/0072963 | A1* | 3/2020 | Yu | G01S 7/006 |
| 2020/0183416 | A1* | 6/2020 | Cheng | H04L 67/12 |
| 2021/0219268 | A1* | 7/2021 | Li | H04W 72/02 |
| 2021/0297135 | A1* | 9/2021 | Kim | H04B 7/0626 |
| 2022/0327929 | A1* | 10/2022 | Hwang | G08G 1/096783 |
| 2023/0176212 | A1* | 6/2023 | Kim | G01S 7/497<br>455/456.1 |
| 2023/0377460 | A1* | 11/2023 | Sivanesan | G08G 1/096775 |
| 2023/0413026 | A1* | 12/2023 | Khosla | G08G 1/0145 |
| 2026/0036693 | A1* | 2/2026 | Nekoui | G01S 13/931 |

FOREIGN PATENT DOCUMENTS

| | | | | |
|---|---|---|---|---|
| WO | WO-2017134578 | A1 * | 8/2017 | H04W 72/23 |
| WO | WO-2021020623 | A1 * | 2/2021 | H04W 4/38 |

* cited by examiner

Figure 14:
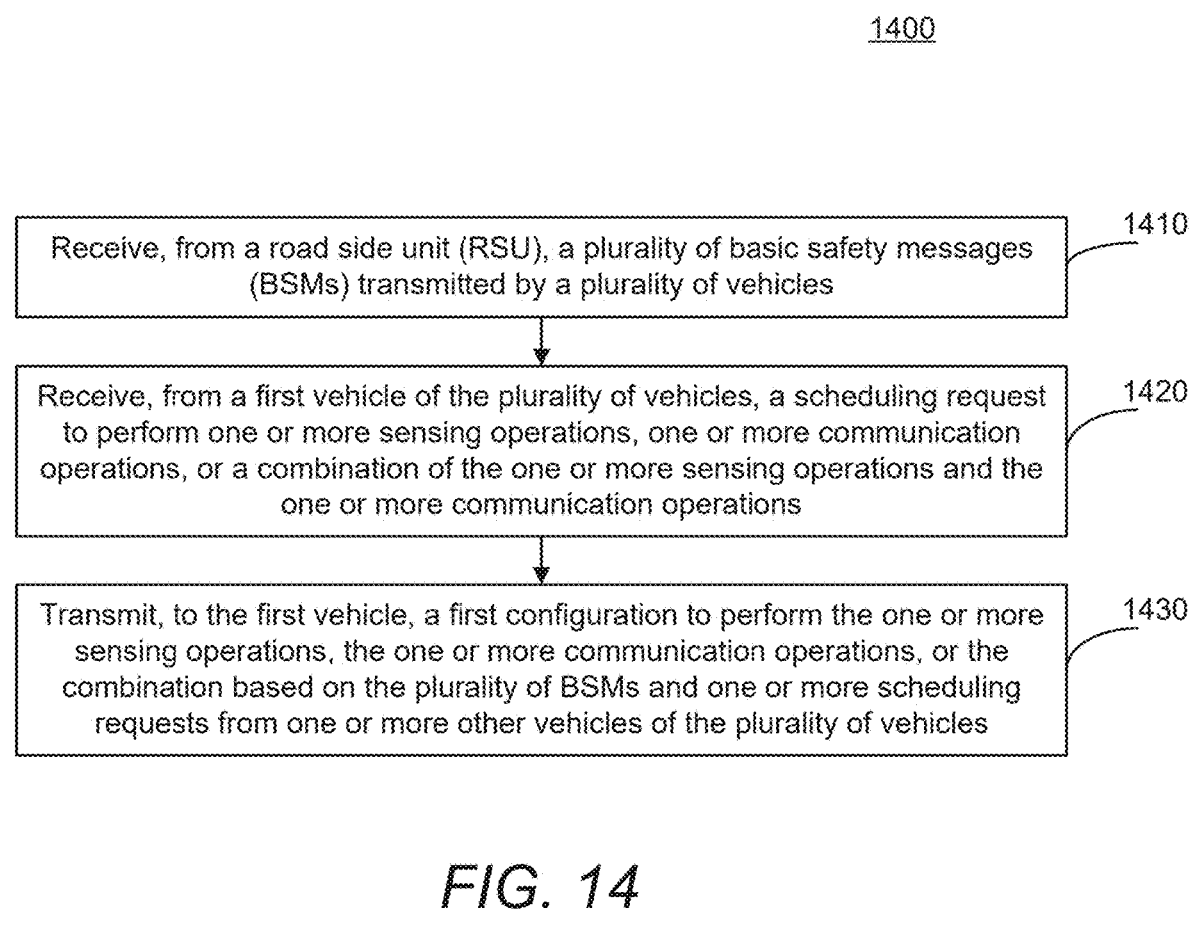

1400

1410 Receive, from a road side unit (RSU), a plurality of basic safety messages (BSMs) transmitted by a plurality of vehicles 1420 Receive, from a first vehicle of the plurality of vehicles, a scheduling request to perform one or more sensing operations, one or more communication operations, or a combination of the one or more sensing operations and the one or more communication operations 1430 Transmit, to the first vehicle, a first configuration to perform the one or more sensing operations, the one or more communication operations, or the combination based on the plurality of BSMs and one or more scheduling requests from one or more other vehicles of the plurality of vehicles

Figure 15:
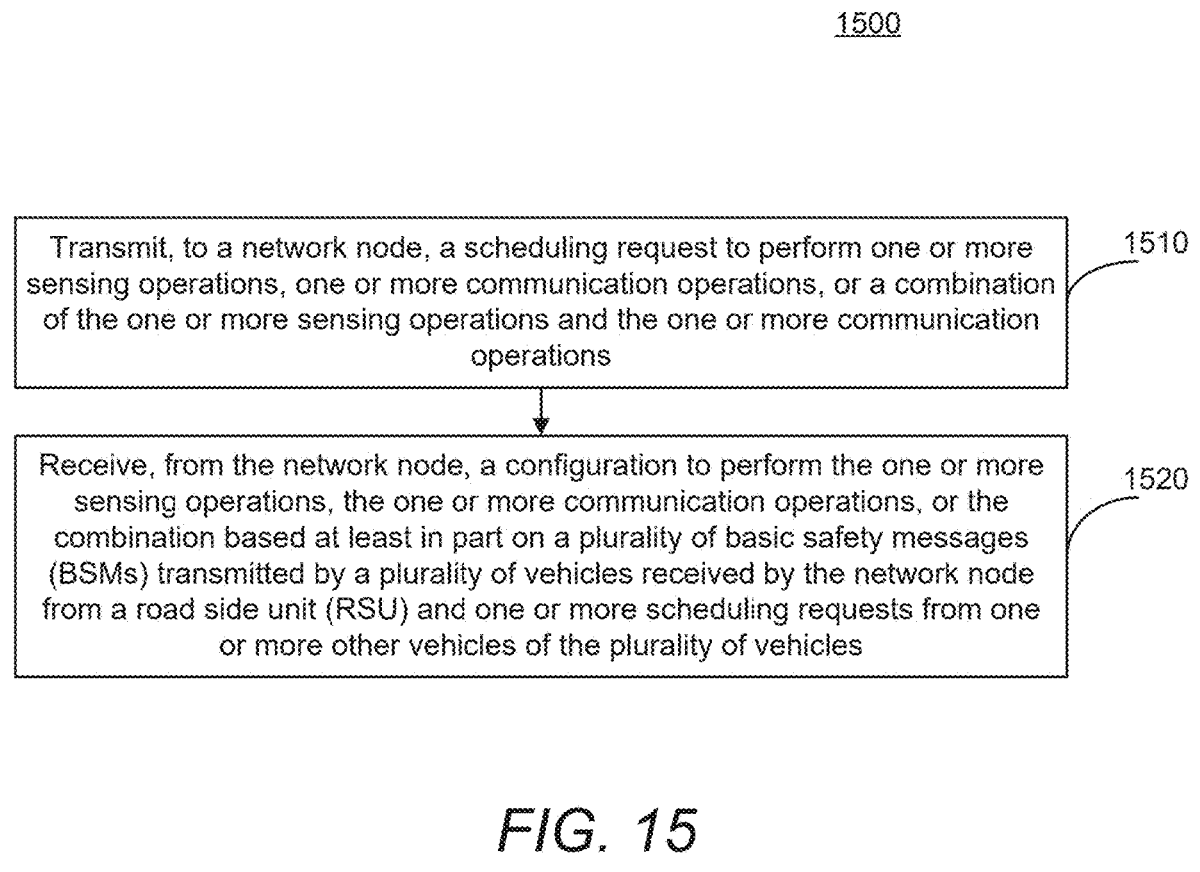

Transmit, to a network node, a scheduling request to perform one or more sensing operations, one or more communication operations, or a combination of the one or more sensing operations and the one or more communication operations

1510

Receive, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles

VEHICLE-TO-EVERYTHING (V2X) ASSISTED INTEGRATED SENSING AND COMMUNICATION

TECHNICAL FIELD

Aspects of the disclosure relate generally to wireless technologies.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), radio frequency (RF) sensing, and other technical enhancements. These enhancements, as well as the use of higher frequency bands, advances in PRS processes and technology, and high-density deployments for 5G, enable highly accurate 5G-based sensing and positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In some aspects, a method of configuring vehicle sensing and communication at a network node includes receiving, from a road side unit (RSU), a plurality of basic safety messages (BSMs) transmitted by a plurality of vehicles; receiving, from a first vehicle of the plurality of vehicles, a scheduling request to perform one or more sensing operations, one or more communication operations, or a combination of the one or more sensing operations and the one or more communication operations; and transmitting, to the first vehicle, a first configuration to perform the one or more sensing operations, the one or more communication operations, or the combination based on the plurality of BSMs and one or more scheduling requests from one or more other vehicles of the plurality of vehicles.

In some aspects, a method of performing one or more integrated sensing and communication (ISAC) operations at a vehicle includes transmitting, to a network node, a scheduling request to perform one or more sensing operations, one or more communication operations, or a combination of the one or more sensing operations and the one or more communication operations; and receiving, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

In some aspects, a network node includes one or more memories; one or more transceivers; and one or more processors communicatively coupled to the one or more memories and the one or more transceivers, the one or more processors, either alone or in combination, configured to: receive, via the one or more transceivers, from a road side unit (RSU), a plurality of basic safety messages (BSMs) transmitted by a plurality of vehicles; receive, via the one or more transceivers, from a first vehicle of the plurality of vehicles, a scheduling request to perform one or more sensing operations, one or more communication operations, or a combination of the one or more sensing operations and the one or more communication operations; and transmit, via the one or more transceivers, to the first vehicle, a first configuration to perform the one or more sensing operations, the one or more communication operations, or the combination based on the plurality of BSMs and one or more scheduling requests from one or more other vehicles of the plurality of vehicles.

In some aspects, a vehicle includes one or more memories; one or more transceivers; and one or more processors communicatively coupled to the one or more memories and the one or more transceivers, the one or more processors, either alone or in combination, configured to: transmit, via the one or more transceivers, to a network node, a scheduling request to perform one or more sensing operations, one or more communication operations, or a combination of the one or more sensing operations and the one or more communication operations; and receive, via the one or more transceivers, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

In some aspects, a network node includes means for receiving, from a road side unit (RSU), a plurality of basic safety messages (BSMs) transmitted by a plurality of vehicles; means for receiving, from a first vehicle of the plurality of vehicles, a scheduling request to perform one or more sensing operations, one or more communication operations, or a combination of the one or more sensing operations and the one or more communication operations; and means for transmitting, to the first vehicle, a first configuration to perform the one or more sensing operations, the one or more communication operations, or the combination based on the plurality of BSMs and one or more scheduling requests from one or more other vehicles of the plurality of vehicles.

In some aspects, a vehicle includes means for transmitting, to a network node, a scheduling request to perform one or more sensing operations, one or more communication operations, or a combination of the one or more sensing operations and the one or more communication operations; and means for receiving, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

In some aspects, a non-transitory computer-readable medium stores computer-executable instructions that, when executed by a network node, cause the network node to: receive, from a road side unit (RSU), a plurality of basic safety messages (BSMs) transmitted by a plurality of vehicles; receive, from a first vehicle of the plurality of vehicles, a scheduling request to perform one or more sensing operations, one or more communication operations, or a combination of the one or more sensing operations and the one or more communication operations; and transmit, to the first vehicle, a first configuration to perform the one or more sensing operations, the one or more communication operations, or the combination based on the plurality of BSMs and one or more scheduling requests from one or more other vehicles of the plurality of vehicles.

In some aspects, a non-transitory computer-readable medium stores computer-executable instructions that, when executed by a vehicle, cause the vehicle to: transmit, to a network node, a scheduling request to perform one or more sensing operations, one or more communication operations, or a combination of the one or more sensing operations and the one or more communication operations; and receive, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 14 illustrates an example method of configuring vehicle sensing and communication, according to aspects of the disclosure.

FIG. 15 illustrates an example method of performing one or more integrated sensing and communication (ISAC) operations, according to aspects of the disclosure.

DETAILED DESCRIPTION

Figure 1:
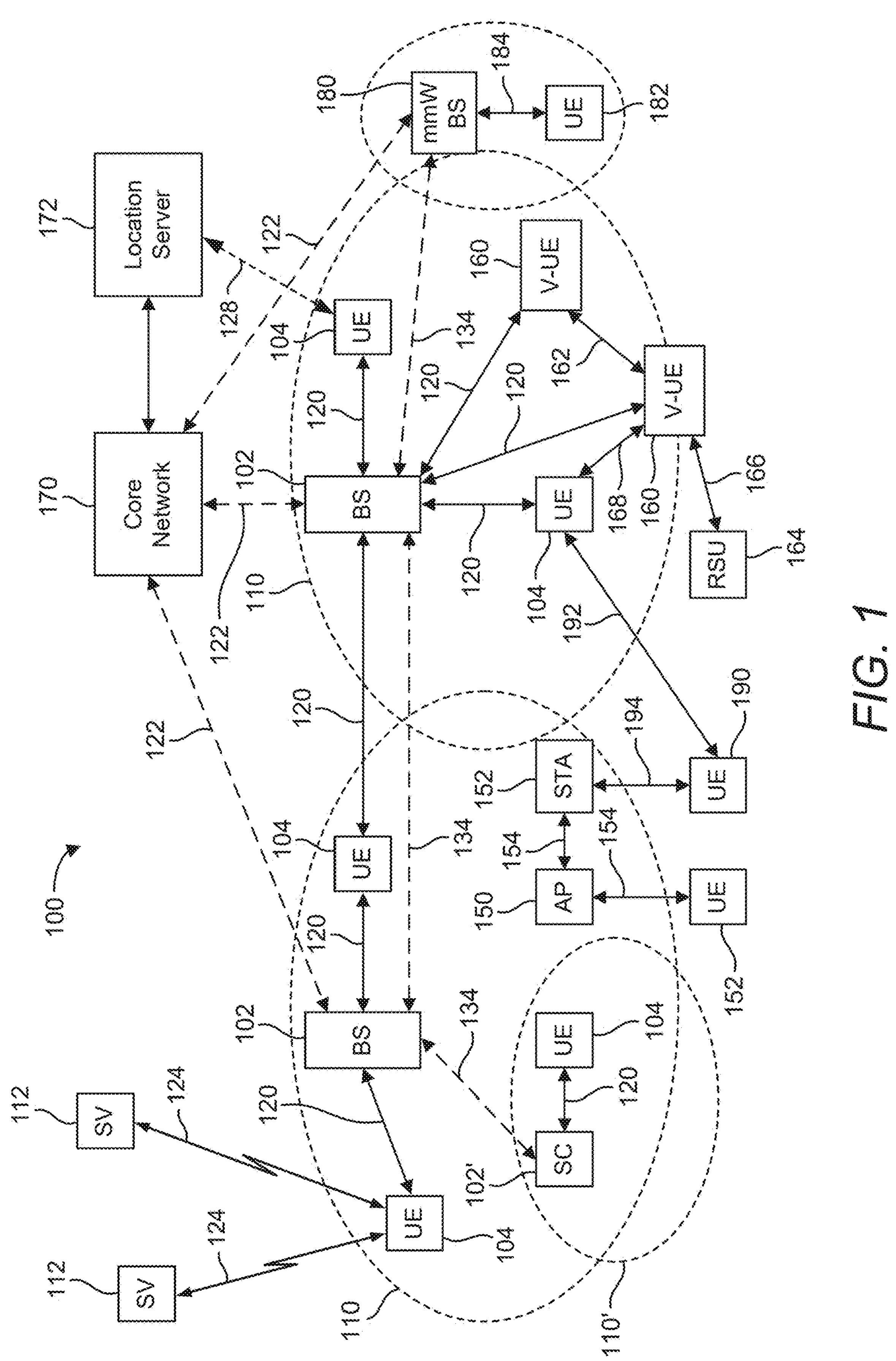
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to integrated sensing and communication (ISAC). Some aspects more specifically relate to scheduling of radar sensing and communication operations. For example, a network node (e.g., a base station) may receive basic safety messages (BSMs) from a road side unit (RSU) transmitted by multiple vehicles and a scheduling request from at least one of the vehicles to perform sensing operations, communication operations, or a combination of both, and in response, transmit a configuration to that vehicle to perform sensing operations, communication operations, or a combination of both, based on the BSMs and scheduling requests from other vehicles.

Particular aspects of the subject matter described in this disclosure can be implemented to realize one or more of the following potential advantages. In some examples, by efficiently scheduling radar sensing and communication operations, the described techniques can be used to allow radar sensing and communication operations by multiple vehicles in the coverage area of a base station based on radar-to-radar and radar-to-communication interference, by using time division multiplexing, spatial division multiplexing, or a combination of both, for efficient radar sensing and communication operations in situations where concurrent radar sensing and communication operations are not feasible.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In some aspects, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In some aspects, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In some aspects, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In some aspects, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In some aspects, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In some aspects, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In some aspects, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
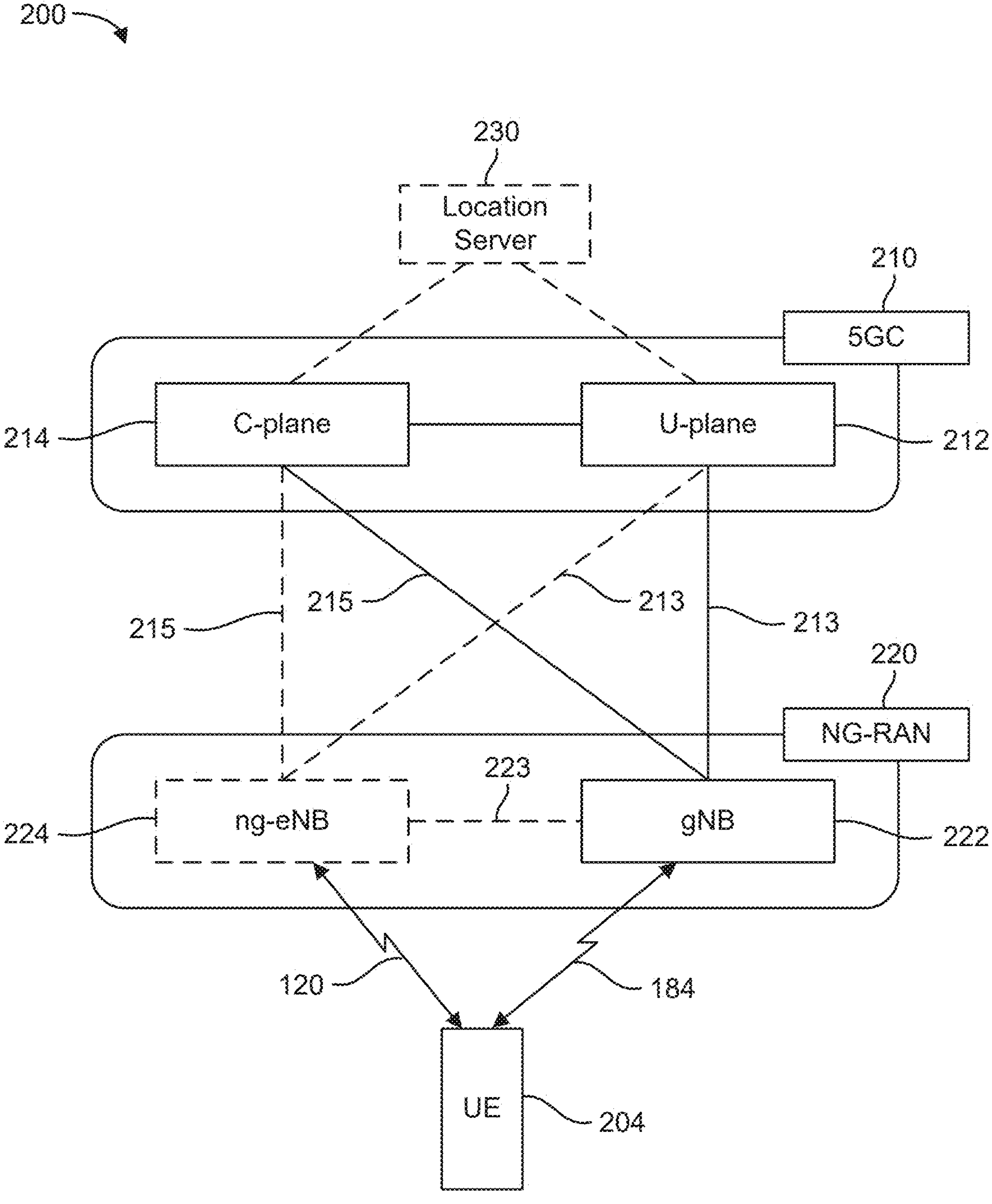
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
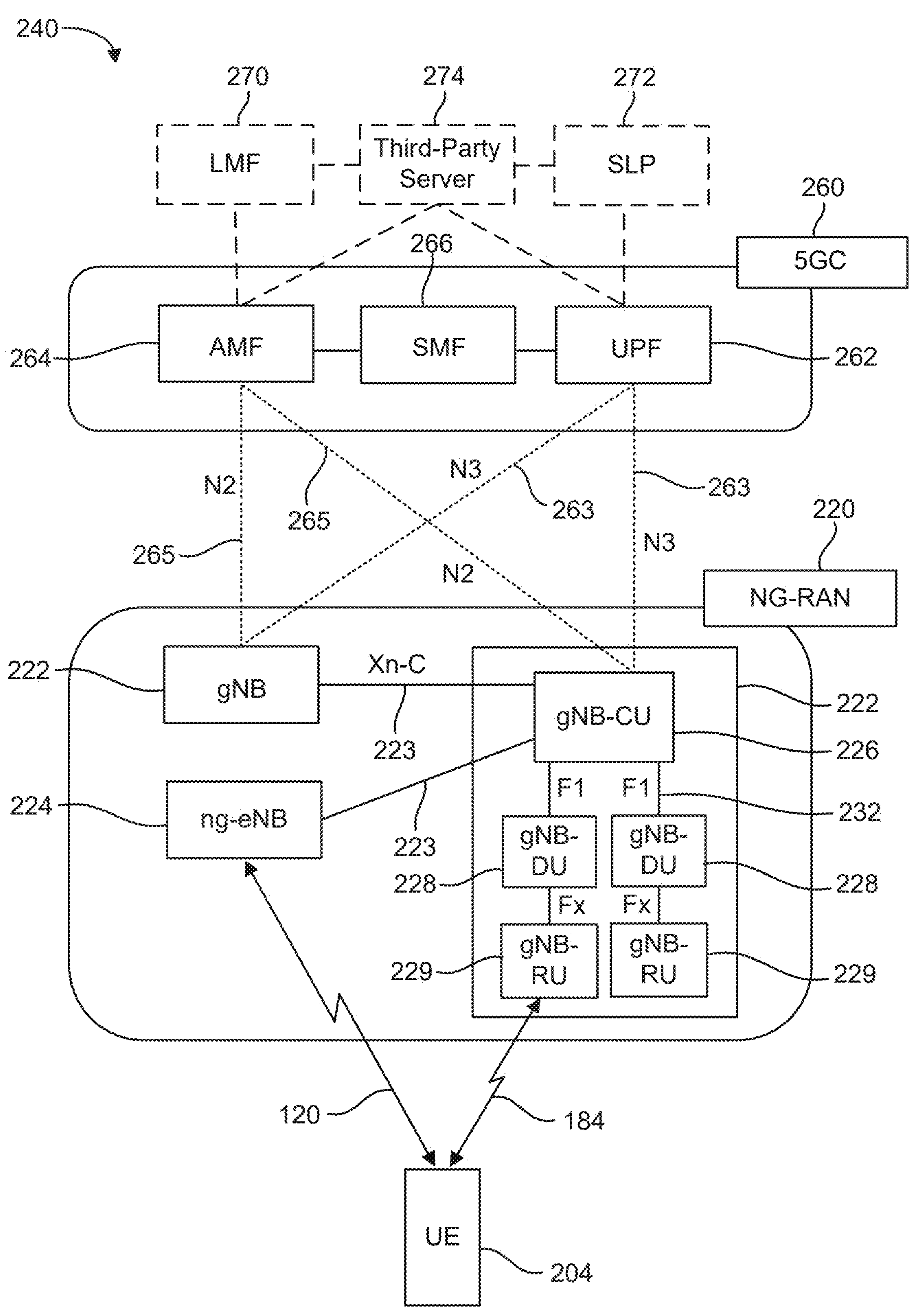

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, AP, TRP, cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
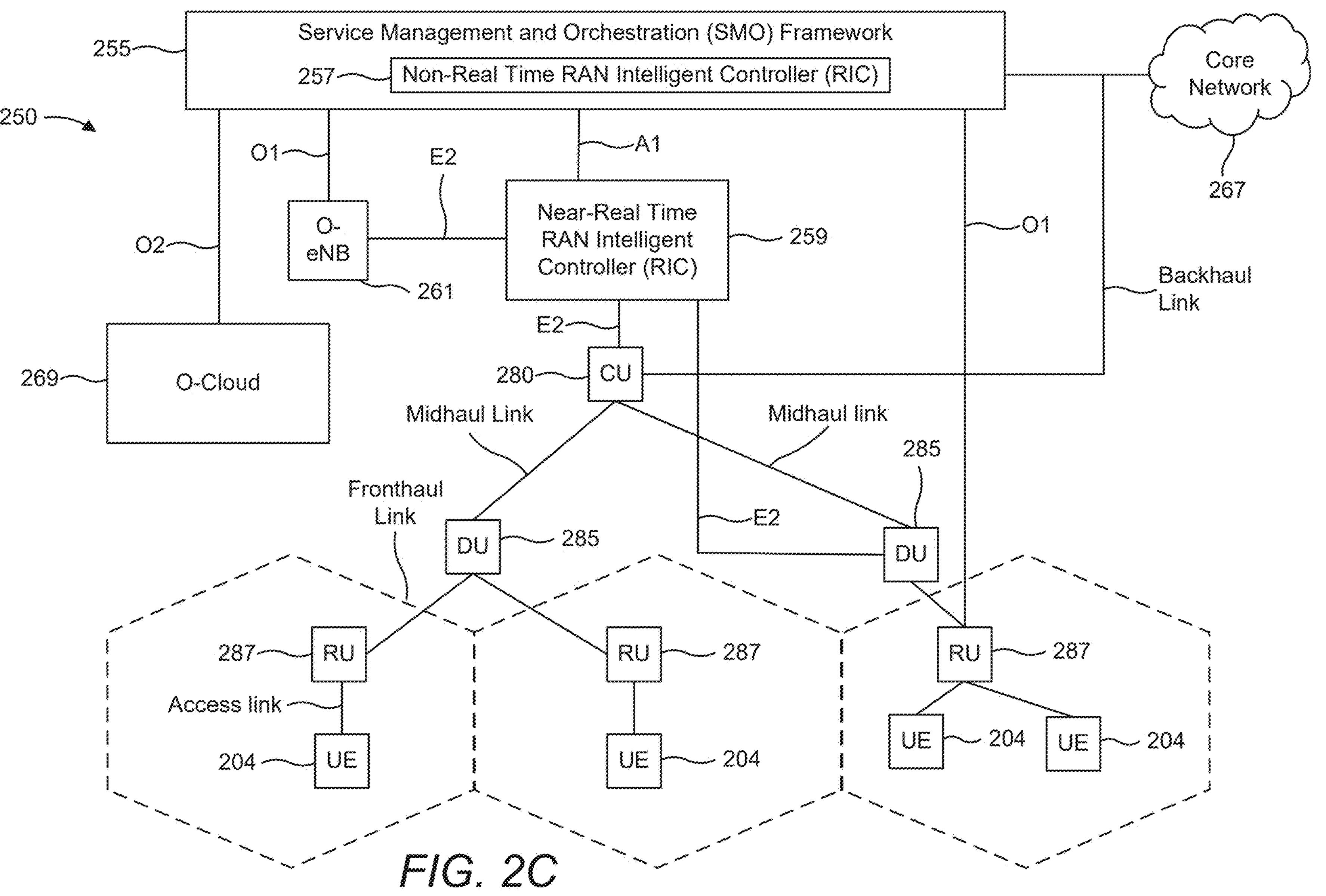

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUS 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit—User Plane (CU-UP)), control plane functionality (i.e., Central Unit—Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (IFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Autonomous and semi-autonomous driving safety technologies use a combination of hardware (sensors, cameras, and radar) and software to help vehicles identify certain safety risks so they can warn the driver to act (in the case of an advanced driver assistance system (ADAS)), or act themselves (in the case of an automated driving system (ADS)), to avoid a crash. A vehicle outfitted with an ADAS or ADS includes one or more camera sensors mounted on the vehicle that capture images of the scene in front of the vehicle, and also possibly behind and to the sides of the vehicle. Radar systems may also be used to detect objects along the road of travel, and also possibly behind and to the sides of the vehicle. Radar systems utilize RF waves to determine the range, direction, speed, and/or altitude of the objects along the road. More specifically, a transmitter transmits pulses of RF waves that bounce off any object(s) in their path. The pulses reflected off the object(s) return a small part of the RF waves' energy to a receiver, which is typically located at the same location as the transmitter. The camera and radar are typically oriented to capture their respective versions of the same scene.

A processor, such as a digital signal processor (DSP), within the vehicle analyzes the captured camera images and radar frames and attempts to identify objects within the captured scene. Such objects may be other vehicles, pedestrians, road signs, objects within the road of travel, etc. The radar system provides reasonably accurate measurements of object distance and velocity in various weather conditions. However, radar systems typically have insufficient resolution to identify features of the detected objects. Camera sensors, however, typically do provide sufficient resolution to identify object features. The cues of object shapes and appearances extracted from the captured images may provide sufficient characteristics for classification of different objects. Given the complementary properties of the two sensors, data from the two sensors can be combined (referred to as "fusion") in a single system for improved performance.

Modern vehicles are increasingly incorporating technology that helps drivers avoid drifting into adjacent lanes or making unsafe lane changes (e.g., lane departure warning (LDW)), or that warns drivers of other vehicles behind them when they are backing up, or that brakes automatically if a vehicle ahead of them stops or slows suddenly (e.g., forward collision warning (FCW)), among other things. The continuing evolution of automotive technology aims to deliver even greater safety benefits, and ultimately deliver ADS' that can handle the entire task of driving without the need for user intervention.

There are six levels that have been defined to achieve full automation. At Level 0, the human driver does all the driving. At Level 1, an ADAS on the vehicle can sometimes assist the human driver with either steering or braking/accelerating, but not both simultaneously. At Level 2, an ADAS on the vehicle can itself actually control both steering and braking/accelerating simultaneously under some circumstances. The human driver must continue to pay full attention at all times and perform the remainder of the driving tasks. At Level 3, an ADS on the vehicle can itself perform all aspects of the driving task under some circumstances. In those circumstances, the human driver must be ready to take back control at any time when the ADS requests the human driver to do so. In all other circumstances, the human driver performs the driving task. At Level 4, an ADS on the vehicle can itself perform all driving tasks and monitor the driving environment, essentially doing all of the driving, in certain circumstances. The human need not pay attention in those circumstances. At Level 5, an ADS on the vehicle can do all the driving in all circumstances. The human occupants are just passengers and need never be involved in driving.

To further enhance ADAS and ADS systems, especially at Level 3 and beyond, autonomous and semi-autonomous vehicles may utilize high definition (HD) map datasets, which contain significantly more detailed information and true-ground-absolute accuracy than those found in current conventional resources. Such HD maps may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by autonomous/semi-autonomous vehicles. HD maps may also provide electronic horizon predictive awareness, which enables autonomous/semi-autonomous vehicles to know what lies ahead.

Note that an autonomous or semi-autonomous vehicle may be, but need not be, a vehicle UE (V-UE). Likewise, a V-UE may be, but need not be, an autonomous or semi-autonomous vehicle. An autonomous or semi-autonomous vehicle is a vehicle outfitted with an ADAS or ADS. A V-UE is a vehicle with cellular connectivity to a 5G or other cellular network. An autonomous or semi-autonomous vehicle that uses, or is capable of using, cellular techniques for positioning and/or navigation is a V-UE.

Figure 3A:
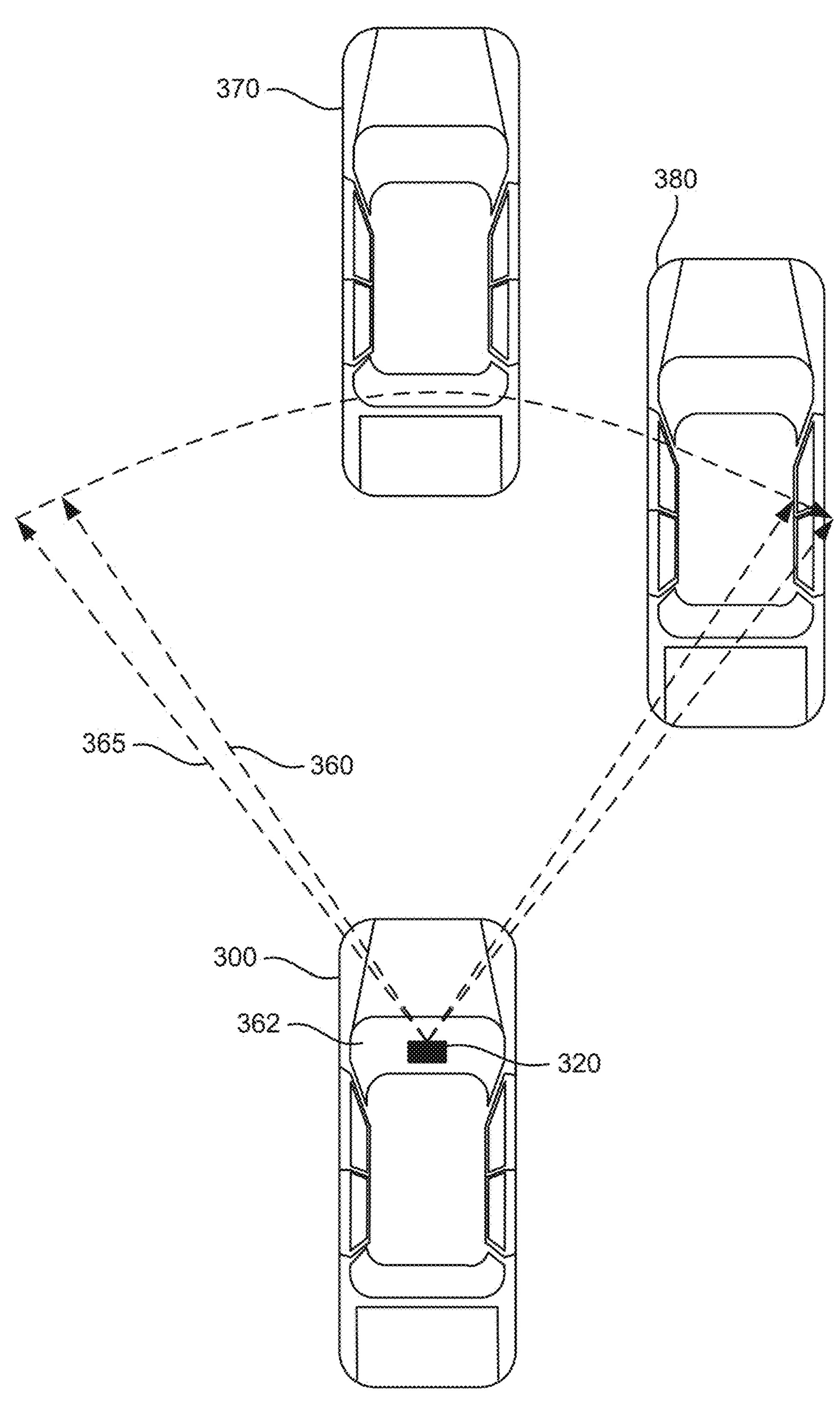
FIG. 3A is a top view of a vehicle employing an integrated radar-camera sensor behind the windshield, according to one or more aspects of the disclosure.

Referring now to FIG. 3A, a V2X-capable vehicle 300 (referred to as an "ego vehicle" or a "host vehicle") is illustrated that includes a radar-camera sensor module 320 located in the interior compartment of the V2X-capable vehicle 300 behind the windshield 362. The radar-camera sensor module 320 includes a radar component configured to transmit radar signals through the windshield 362 in a horizontal coverage zone 365 (shown by dashed lines), and receive reflected radar signals that are reflected off of any objects within the horizontal coverage zone 365. The radar-camera sensor module 320 further includes a camera component for capturing images based on light waves that are seen and captured through the windshield 362 in a horizontal coverage zone 360 (shown by dashed lines).

Although FIG. 3A illustrates an example in which the radar component and the camera component are co-located components in a shared housing, as will be appreciated, they may be separately housed in different locations within the V2X-capable vehicle 300. For example, the camera may be located as shown in FIG. 3A, and the radar component may be located in the grill or front bumper of the V2X-capable vehicle 300. Additionally, although FIG. 3A illustrates the radar-camera sensor module 320 located behind the windshield 362, it may instead be located in a rooftop sensor array, or elsewhere. Further, although FIG. 3A illustrates only a single radar-camera sensor module 320, as will be appreciated, the V2X-capable vehicle 300 may have multiple radar-camera sensor modules 320 pointed in different directions (to the sides, the front, the rear, etc.). The various radar-camera sensor modules 320 may be under the "skin" of the vehicle (e.g., behind the windshield 362, door panels, bumpers, grills, etc.) or within a rooftop sensor array.

The radar-camera sensor module 320 may detect one or more (or none) objects relative to the V2X-capable vehicle 300. In the example of FIG. 3A, there are two objects, vehicles 370 and 380, within the horizontal coverage zones 360 and 365 that the radar-camera sensor module 320 can detect. The radar-camera sensor module 320 may estimate parameters (attributes) of the detected object(s), such as the position, range, direction, speed, size, classification (e.g., vehicle, pedestrian, road sign, etc.), and the like. The radar-camera sensor module 320 may be employed onboard the V2X-capable vehicle 300 for automotive safety applications, such as adaptive cruise control (ACC), FCW, collision mitigation or avoidance via autonomous braking, LDW, and the like.

Co-locating the camera and radar permits these components to share electronics and signal processing, and in particular, enables early radar-camera data fusion. For example, the radar and camera may be integrated onto a single board. A joint radar-camera alignment technique may be employed to align both the radar and the camera. However, co-location of the radar and camera is not required to practice the techniques described herein.

Figure 3B:
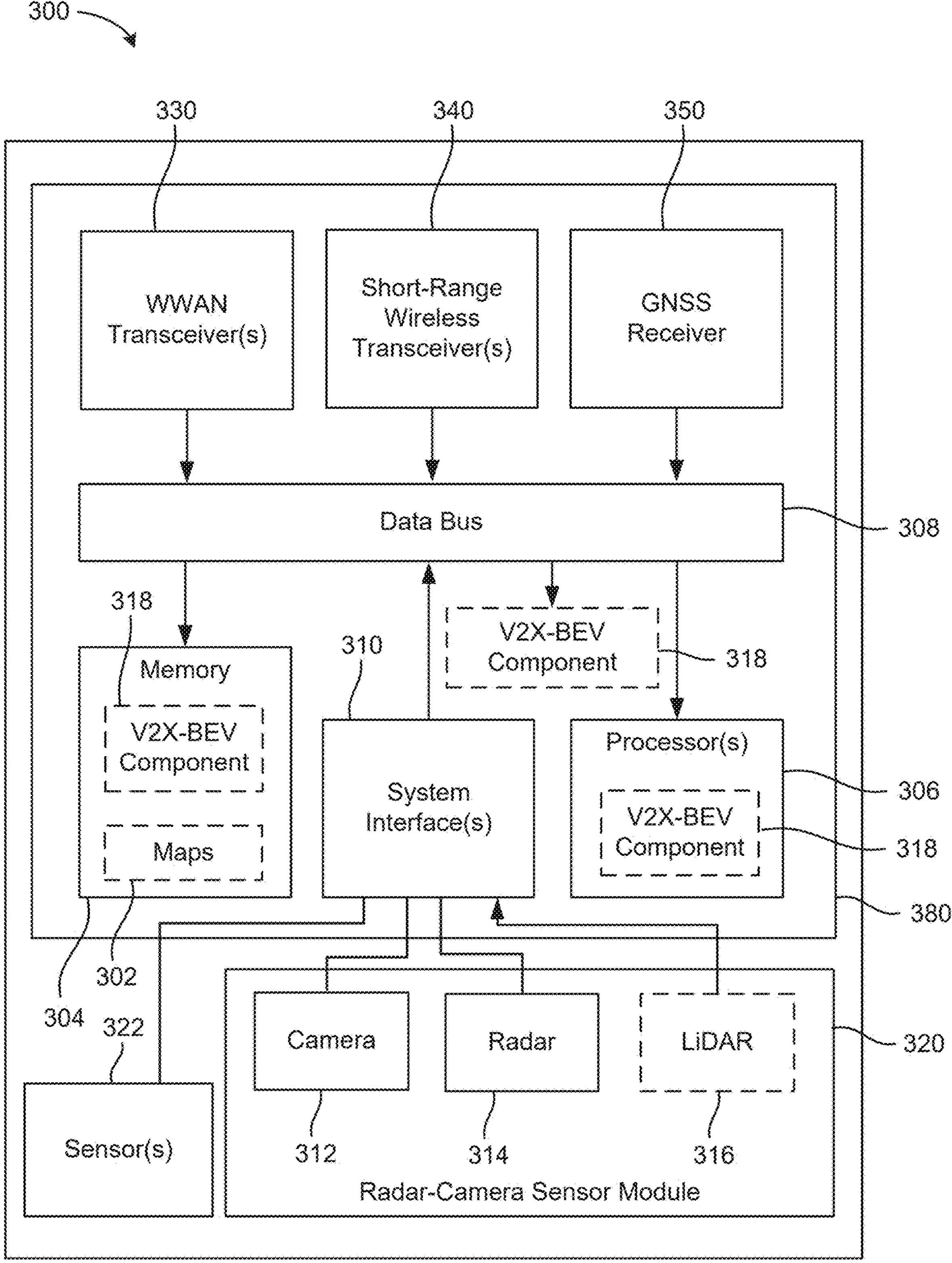
FIG. 3B illustrates an example on-board computer (OBC) architecture, according to one or more aspects of the disclosure.

FIG. 3B illustrates an on-board computer (OBC) 380 of a V2X-capable vehicle 300, according to various aspects of the disclosure. In some aspects, the OBC 380 may be part of an ADAS or ADS. The OBC 380 may also be the V-UE of the V2X-capable vehicle 300. The OBC 380 includes a non-transitory computer-readable storage medium, i.e., memory 304, and one or more processors 306 in communication with the memory 304 via a data bus 308. The memory 304 includes one or more storage modules storing computer-readable instructions executable by the one or more processors 306 to perform the functions of the OBC 380 described herein. For example, the one or more processors 306 in conjunction with the memory 304 may implement the various operations described herein.

One or more radar-camera sensor modules 320 are coupled to the OBC 380 (only one is shown in FIG. 3B for simplicity). In some aspects, the radar-camera sensor module 320 includes at least one camera 312, at least one radar 314, and an optional light detection and ranging (lidar) sensor 316. The OBC 380 also includes one or more system interfaces 310 connecting the one or more processors 306, by way of the data bus 308, to the radar-camera sensor module 320 and, optionally, other vehicle sub-systems (not shown).

The OBC 380 also includes, at least in some cases, one or more wireless wide area network (WWAN) transceivers 330 configured to communicate via one or more wireless communication networks (not shown), such as an NR network, an LTE network, a Global System for Mobile communication (GSM) network, and/or the like. The one or more WWAN transceivers 330 may be connected to one or more antennas (not shown) for communicating with other network nodes, such as other V-UEs, pedestrian UEs, infrastructure access points, roadside units (RSUs), base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The one or more WWAN transceivers 330 may be variously configured for transmitting and encoding signals (e.g., messages, indications, information, and so on), and, conversely, for receiving and decoding signals (e.g., messages, indications, information, pilots, and so on) in accordance with the designated RAT.

The OBC 380 also includes, at least in some cases, one or more short-range wireless transceivers 340 (e.g., a Wi-Fi transceiver, a BLUETOOTH® transceiver, etc.). The one or more short-range wireless transceivers 340 may be connected to one or more antennas (not shown) for communicating with other network nodes, such as other V-UEs, pedestrian UEs, infrastructure access points, RSUs, etc., via at least one designated RAT (e.g., cV2X), IEEE 802.11p (also known as wireless access for vehicular environments (WAVE)), dedicated short-range communication (DSRC), etc.) over a wireless communication medium of interest. The one or more short-range wireless transceivers 340 may be variously configured for transmitting and encoding signals (e.g., messages, indications, information, and so on), and, conversely, for receiving and decoding signals (e.g., messages, indications, information, pilots, and so on) in accordance with the designated RAT.

As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing).

The OBC 380 also includes, at least in some cases, a global navigation satellite system (GNSS) receiver 350. The GNSS receiver 350 may be connected to one or more antennas (not shown) for receiving satellite signals. The GNSS receiver 350 may comprise any suitable hardware and/or software for receiving and processing GNSS signals. The GNSS receiver 350 requests information and operations as appropriate from the other systems, and performs the calculations necessary to determine the vehicle's 300 position using measurements obtained by any suitable GNSS algorithm.

In some aspects, the OBC 380 may utilize the one or more WWAN transceivers 330 and/or the one or more short-range wireless transceivers 340 to download one or more maps 302 that can then be stored in memory 304 and used for vehicle navigation. Map(s) 302 may be one or more high definition (HD) maps, which may provide accuracy in the 7-10 cm absolute ranges, highly detailed inventories of all stationary physical assets related to roadways, such as road lanes, road edges, shoulders, dividers, traffic signals, signage, paint markings, poles, and other data useful for the safe navigation of roadways and intersections by the V2X-capable vehicle 300. Map(s) 302 may also provide electronic horizon predictive awareness, which enables the V2X-capable vehicle 300 to know what lies ahead.

The V2X-capable vehicle 300 may include one or more sensors 322 that may be coupled to the one or more processors 306 via the one or more system interfaces 310. The one or more sensors 322 may provide means for sensing or detecting information related to the state and/or environment of the V2X-capable vehicle 300, such as speed, heading (e.g., compass heading), headlight status, gas mileage, etc. By way of example, the one or more sensors 322 may include an odometer a speedometer, a tachometer, an accelerometer (e.g., a micro-electromechanical system-s (MEMS) device), a gyroscope, a geomagnetic sensor (e.g., a compass), an altimeter (e.g., a barometric pressure altimeter), etc. Although shown as located outside the OBC 380, some of these sensors 322 may be located on the OBC 380 and some may be located elsewhere in the V2X-capable vehicle 300.

The OBC 380 may further include a V2X-BEV component 318. The V2X-BEV component 318 may be a hardware circuit that is part of or coupled to the one or more processors 306 that, when executed, causes the OBC 380 to perform the functionality described herein. In other aspects, the V2X-BEV component 318 may be external to the one or more processors 306 (e.g., part of a positioning processing system, integrated with another processing system, etc.). Alternatively, the V2X-BEV component 318 may be one or more memory modules stored in the memory 304 that, when executed by the one or more processors 306 (or positioning processing system, another processing system, etc.), cause the OBC 380 to perform the functionality described herein. As a specific example, the V2X-BEV component 318 may comprise a plurality of positioning engines, a positioning engine aggregator, a sensor fusion module, and/or the like. FIG. 3B illustrates possible locations of the V2X-BEV component 318, which may be, for example, part of the memory 304, the one or more processors 306, or any combination thereof, or may be a standalone component.

In some aspects, the camera 312 may capture image frames (also referred to herein as camera frames) of the scene within the viewing area of the camera 312 (as illustrated in FIG. 3A as horizontal coverage zone 360) at some periodic rate. Likewise, the radar 314 may capture radar frames of the scene within the viewing area of the radar 314 (as illustrated in FIG. 3A as horizontal coverage zone 365) at some periodic rate. The periodic rates at which the camera 312 and the radar 314 capture their respective frames may be the same or different. Each camera and radar frame may be timestamped. Thus, where the periodic rates are different, the timestamps can be used to select simultaneously, or nearly simultaneously, captured camera and radar frames for further processing (e.g., fusion).

For convenience, the OBC 380 is shown in FIG. 3B as including various components that may be configured according to the various examples described herein. It will be appreciated, however, that the illustrated components may have different functionality in different designs. In particular, various components in FIG. 3B are optional in alternative configurations and the various aspects include configurations that may vary due to design choice, costs, use of the device, or other considerations. For brevity, illustration of the various alternative configurations is not provided herein, but would be readily understandable to one skilled in the art.

The components of FIG. 3B may be implemented in various ways. In some implementations, the components of FIG. 3B may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 302 to 350 may be implemented by processor and memory component(s) of the OBC 380 (e.g., by execution of appropriate code and/or by appropriate configuration of processor components). For simplicity, various operations, acts, and/or functions are described herein as being performed "by a UE," "by an OBC," or "by a vehicle." However, as will be appreciated, such operations, acts, and/or functions may actually be performed by specific components or combinations of components of the OBC 380, such as the one or more processors 306, the one or more transceivers 330 and 340, the memory 304, the V2X-BEV component 318, etc.

In an autonomous or semi-autonomous driving scenario, the ego vehicle needs to make various driving decisions, such when to change lanes (e.g., to avoid obstacles, move to an exit lane, etc.), where to merge into traffic, whether to pass another vehicle, and the like. These types of decisions are referred to as "driving policy" or "drive policy" and may be executed by the OBC 380 (e.g., the one or more processors 306, V2X-BEV component 318, memory 304, etc.) based on information from the radar-camera sensor module 320 and/or sensor(s) 322.

Figure 4A:
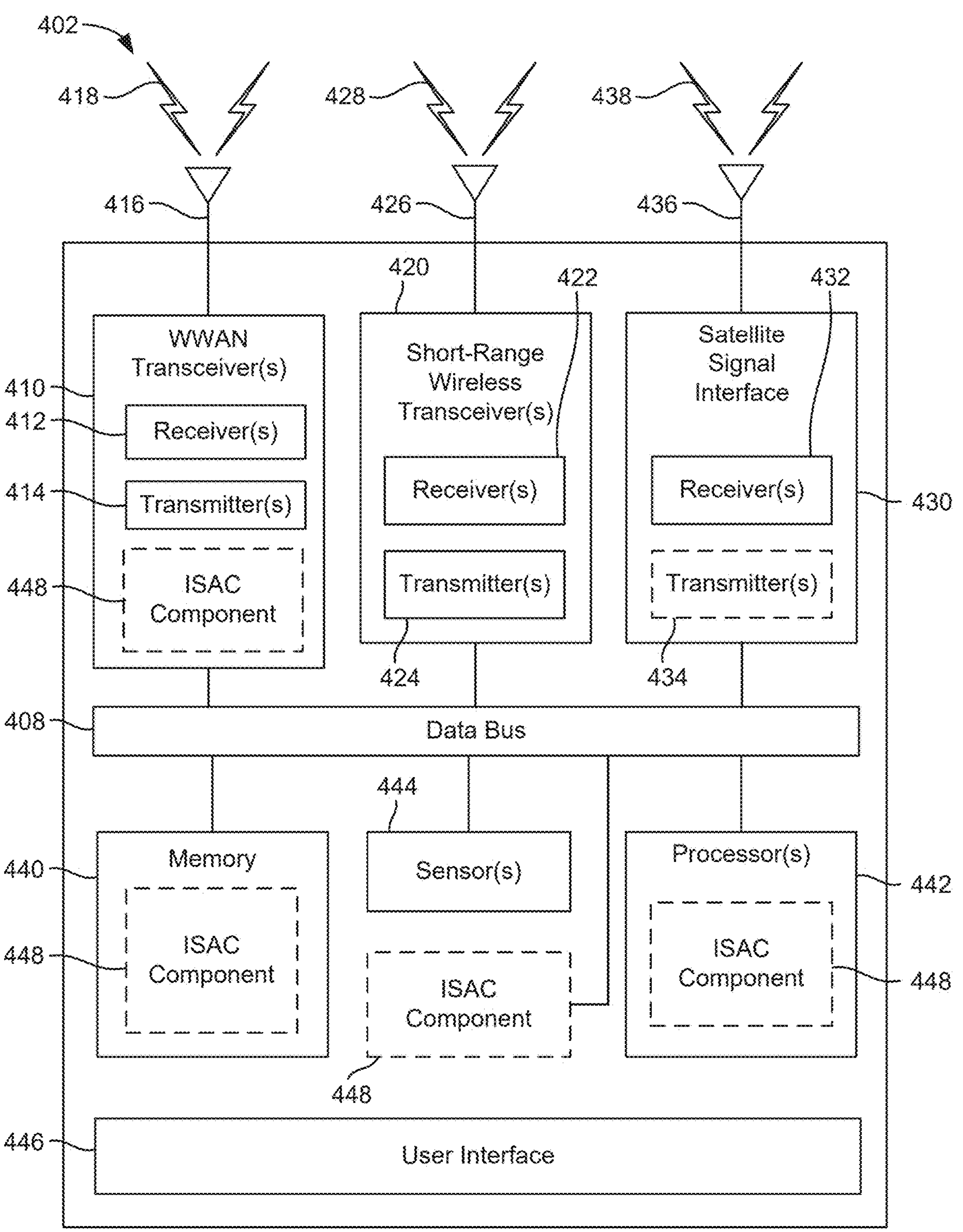
FIGS. 4A, 4B, and 4C are simplified block diagrams of several sample aspects of components that may be employed in a user equipment (UE), a base station, and a network entity, respectively, and configured to support communications as taught herein.
Figure 4B:
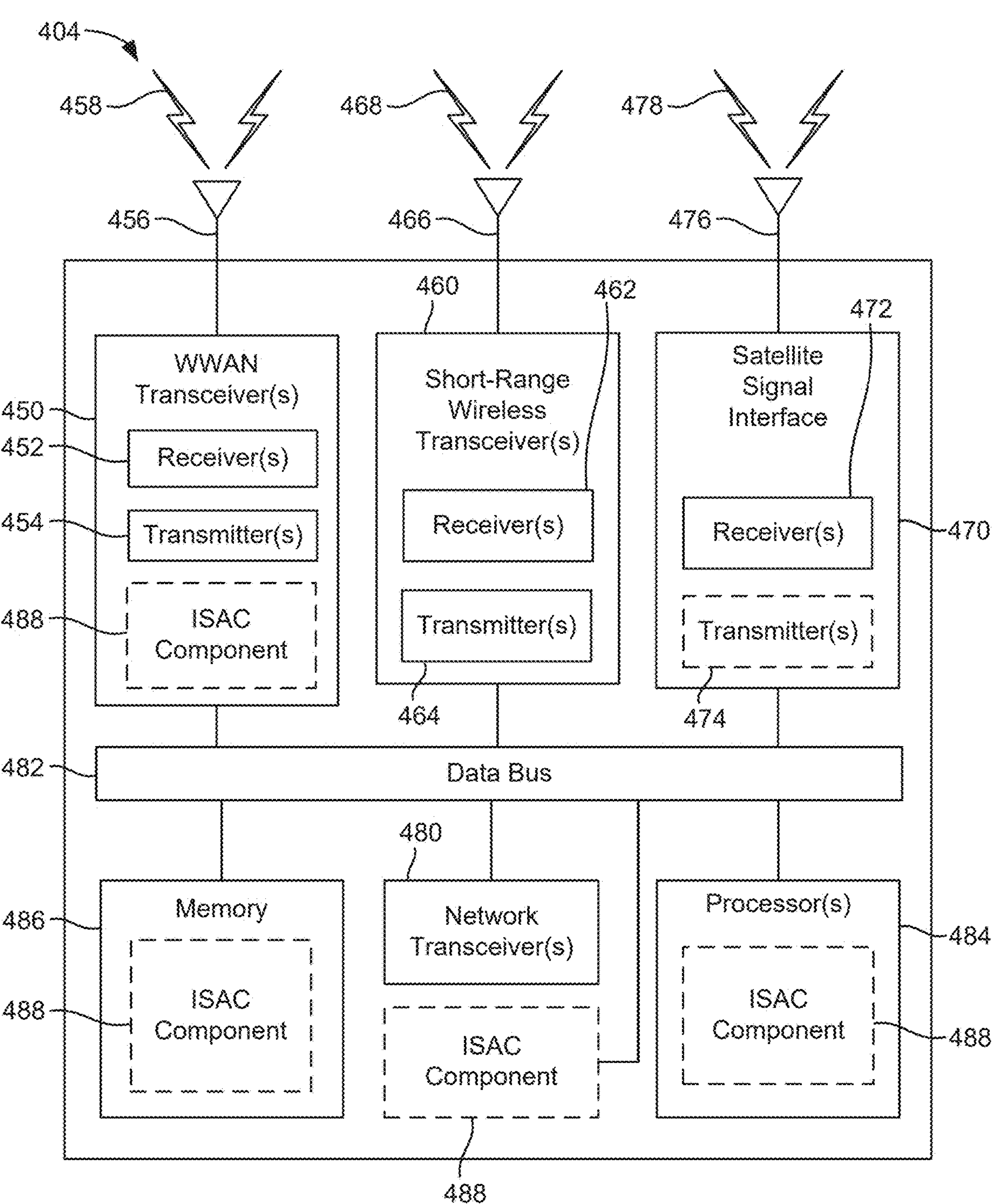
Figure 4C:
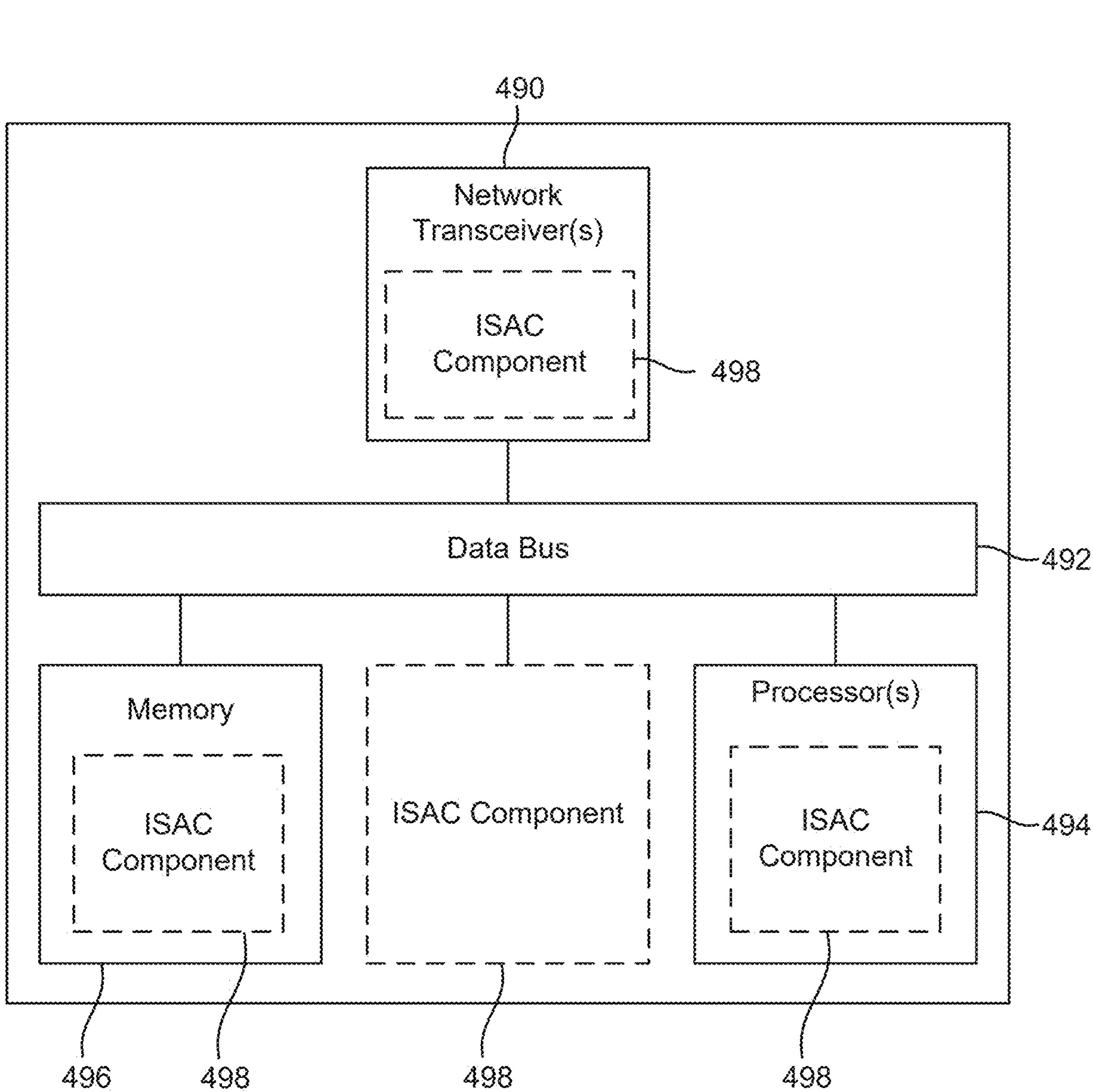

FIGS. 4A, 4B, and 4C illustrate several example components (represented by corresponding blocks) that may be incorporated into a UE 402 (which may correspond to any of the UEs described herein), a base station 404 (which may correspond to any of the base stations described herein), and a network entity 406 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 402 and the base station 404 each include one or more wireless wide area network (WWAN) transceivers 410 and 450, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 410 and 450 may each be connected to one or more antennas 416 and 456, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 410 and 450 may be variously configured for transmitting and encoding signals 418 and 458 (e.g., messages, indications, information, and so on), respectively, and, conversely, for receiving and decoding signals 418 and 458 (e.g., messages, indications, information, pilots, and so on), respectively, in accordance with the designated RAT. Specifically, the WWAN transceivers 410 and 450 include one or more transmitters 414 and 454, respectively, for transmitting and encoding signals 418 and 458, respectively, and one or more receivers 412 and 452, respectively, for receiving and decoding signals 418 and 458, respectively.

The UE 402 and the base station 404 each also include, at least in some cases, one or more short-range wireless transceivers 420 and 460, respectively. The short-range wireless transceivers 420 and 460 may be connected to one or more antennas 426 and 466, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 420 and 460 may be variously configured for transmitting and encoding signals 428 and 468 (e.g., messages, indications, information, and so on), respectively, and, conversely, for receiving and decoding signals 428 and 468 (e.g., messages, indications, information, pilots, and so on), respectively, in accordance with the designated RAT. Specifically, the short-range wireless transceivers 420 and 460 include one or more transmitters 424 and 464, respectively, for transmitting and encoding signals 428 and 468, respectively, and one or more receivers 422 and 462, respectively, for receiving and decoding signals 428 and 468, respectively. As specific examples, the short-range wireless transceivers 420 and 460 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 402 and the base station 404 also include, at least in some cases, satellite signal interfaces 430 and 470, which each include one or more satellite signal receivers 432 and 472, respectively, and may optionally include one or more satellite signal transmitters 434 and 474, respectively. In some cases, the base station 404 may be a terrestrial base station that may communicate with space vehicles (e.g., space vehicles 112) via the satellite signal interface 470. In other cases, the base station 404 may be a space vehicle (or other non-terrestrial entity) that uses the satellite signal interface 470 to communicate with terrestrial networks and/or other space vehicles.

The satellite signal receivers 432 and 472 may be connected to one or more antennas 436 and 476, respectively, and may provide means for receiving and/or measuring satellite positioning/communication signals 438 and 478, respectively. Where the satellite signal receiver(s) 432 and 472 are satellite positioning system receivers, the satellite positioning/communication signals 438 and 478 may be global positioning system (GPS) signals, global navigation satellite system (GLONASS) signals, Galileo signals, Beidou signals, Indian Regional Navigation Satellite System (NAVIC), Quasi-Zenith Satellite System (QZSS) signals, etc. Where the satellite signal receiver(s) 432 and 472 are non-terrestrial network (NTN) receivers, the satellite positioning/communication signals 438 and 478 may be communication signals (e.g., carrying control and/or user data) originating from a 5G network. The satellite signal receiver(s) 432 and 472 may comprise any suitable hardware and/or software for receiving and processing satellite positioning/communication signals 438 and 478, respectively. The satellite signal receiver(s) 432 and 472 may request information and operations as appropriate from the other systems, and, at least in some cases, perform calculations to determine locations of the UE 402 and the base station 404, respectively, using measurements obtained by any suitable satellite positioning system algorithm.

The optional satellite signal transmitter(s) 434 and 474, when present, may be connected to the one or more antennas 436 and 476, respectively, and may provide means for transmitting satellite positioning/communication signals 438 and 478, respectively. Where the satellite signal transmitter(s) 474 are satellite positioning system transmitters, the satellite positioning/communication signals 478 may be GPS signals, GLONASS® signals, Galileo signals, Beidou signals, NAVIC, QZSS signals, etc. Where the satellite signal transmitter(s) 434 and 474 are NTN transmitters, the satellite positioning/communication signals 438 and 478 may be communication signals (e.g., carrying control and/or user data) originating from a 5G network. The satellite signal transmitter(s) 434 and 474 may comprise any suitable hardware and/or software for transmitting satellite positioning/communication signals 438 and 478, respectively. The satellite signal transmitter(s) 434 and 474 may request information and operations as appropriate from the other systems.

The base station 404 and the network entity 406 each include one or more network transceivers 480 and 490, respectively, providing means for communicating (e.g., means for transmitting, means for receiving, etc.) with other network entities (e.g., other base stations 404, other network entities 406). For example, the base station 404 may employ the one or more network transceivers 480 to communicate with other base stations 404 or network entities 406 over one or more wired or wireless backhaul links. As another example, the network entity 406 may employ the one or more network transceivers 490 to communicate with one or more base station 404 over one or more wired or wireless backhaul links, or with other network entities 406 over one or more wired or wireless core network interfaces.

A transceiver may be configured to communicate over a wired or wireless link. A transceiver (whether a wired transceiver or a wireless transceiver) includes transmitter circuitry (e.g., transmitters 414, 424, 454, 464) and receiver circuitry (e.g., receivers 412, 422, 452, 462). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 480 and 490 in some implementations) may be coupled to one or more wired network interface ports. Wireless transmitter circuitry (e.g., transmitters 414, 424, 454, 464) may include or be coupled to a plurality of antennas (e.g., antennas 416, 426, 456, 466), such as an antenna array, that permits the respective apparatus (e.g., UE 402, base station 404) to perform transmit "beamforming," as described herein. Similarly, wireless receiver circuitry (e.g., receivers 412, 422, 452, 462) may include or be coupled to a plurality of antennas (e.g., antennas 416, 426, 456, 466), such as an antenna array, that permits the respective apparatus (e.g., UE 402, base station 404) to perform receive beamforming, as described herein. In some aspects, the transmitter circuitry and receiver circuitry may share the same plurality of antennas (e.g., antennas 416, 426, 456, 466), such that the respective apparatus can only receive or transmit at a given time, not both at the same time. A wireless transceiver (e.g., WWAN transceivers 410 and 450, short-range wireless transceivers 420 and 460) may also include a network listen module (NLM) or the like for performing various measurements.

As used herein, the various wireless transceivers (e.g., transceivers 410, 420, 450, and 460, and network transceivers 480 and 490 in some implementations) and wired transceivers (e.g., network transceivers 480 and 490 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 402) and a base station (e.g., base station 404) will generally relate to signaling via a wireless transceiver.

The UE 402, the base station 404, and the network entity 406 also include other components that may be used in conjunction with the operations as disclosed herein. The UE 402, the base station 404, and the network entity 406 include one or more processors 442, 484, and 494, respectively, for providing functionality relating to, for example, wireless communication, and for providing other processing functionality. The processors 442, 484, and 494 may therefore provide means for processing, such as means for determining, means for calculating, means for receiving, means for transmitting, means for indicating, etc. In some aspects, the processors 442, 484, and 494 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 402, the base station 404, and the network entity 406 include memory circuitry implementing memories 440, 486, and 496 (e.g., each including a memory device), respectively, for maintaining information (e.g., information indicative of reserved resources, thresholds, parameters, and so on). The memories 440, 486, and 496 may therefore provide means for storing, means for retrieving, means for maintaining, etc. In some cases, the UE 402, the base station 404, and the network entity 406 may include integrated sensing and communication (ISAC) component 448, 488, and 498, respectively. The ISAC component 448, 488, and 498 may be hardware circuits that are part of or coupled to the processors 442, 484, and 494, respectively, that, when executed, cause the UE 402, the base station 404, and the network entity 406 to perform the functionality described herein. In other aspects, the ISAC component 448, 488, and 498 may be external to the processors 442, 484, and 494 (e.g., part of a modem processing system, integrated with another processing system, etc.). Alternatively, the ISAC component 448, 488, and 498 may be memory modules stored in the memories 440, 486, and 496, respectively, that, when executed by the processors 442, 484, and 494 (or a modem processing system, another processing system, etc.), cause the UE 402, the base station 404, and the network entity 406 to perform the functionality described herein. FIG. 4A illustrates possible locations of the ISAC component 448, which may be, for example, part of the one or more WWAN transceivers 410, the memory 440, the one or more processors 442, or any combination thereof, or may be a standalone component. FIG. 4B illustrates possible locations of the ISAC component 488, which may be, for example, part of the one or more WWAN transceivers 450, the memory 486, the one or more processors 484, or any combination thereof, or may be a standalone component. FIG. 4C illustrates possible locations of the ISAC component 498, which may be, for example, part of the one or more network transceivers 490, the memory 496, the one or more processors 494, or any combination thereof, or may be a standalone component.

The UE 402 may include one or more sensors 444 coupled to the one or more processors 442 to provide means for sensing or detecting movement and/or orientation information that is independent of motion data derived from signals received by the one or more WWAN transceivers 410, the one or more short-range wireless transceivers 420, and/or the satellite signal interface 430. By way of example, the sensor(s) 444 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 444 may include a plurality of different types of devices and combine their outputs in order to provide motion information. For example, the sensor(s) 444 may use a combination of a multi-axis accelerometer and orientation sensors to provide the ability to compute positions in two-dimensional (2D) and/or three-dimensional (3D) coordinate systems.

In addition, the UE 402 includes a user interface 446 providing means for providing indications (e.g., audible and/or visual indications) to a user and/or for receiving user input (e.g., upon user actuation of a sensing device such a keypad, a touch screen, a microphone, and so on). Although not shown, the base station 404 and the network entity 406 may also include user interfaces.

Referring to the one or more processors 484 in more detail, in the downlink, IP packets from the network entity 406 may be provided to the processor 484. The one or more processors 484 may implement functionality for an RRC layer, a packet data convergence protocol (PDCP) layer, a radio link control (RLC) layer, and a medium access control (MAC) layer. The one or more processors 484 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 454 and the receiver 452 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 454 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 402. Each spatial stream may then be provided to one or more different antennas 456. The transmitter 454 may modulate an RF carrier with a respective spatial stream for transmission.

At the UE 402, the receiver 412 receives a signal through its respective antenna(s) 416. The receiver 412 recovers information modulated onto an RF carrier and provides the information to the one or more processors 442. The transmitter 414 and the receiver 412 implement Layer-1 functionality associated with various signal processing functions. The receiver 412 may perform spatial processing on the information to recover any spatial streams destined for the UE 402. If multiple spatial streams are destined for the UE 402, they may be combined by the receiver 412 into a single OFDM symbol stream. The receiver 412 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 404. These soft decisions may be based on channel estimates computed by a channel estimator. The soft decisions are then decoded and de-interleaved to recover the data and control signals that were originally transmitted by the base station 404 on the physical channel. The data and control signals are then provided to the one or more processors 442, which implements Layer-3 (L3) and Layer-2 (L2) functionality.

In the downlink, the one or more processors 442 provides demultiplexing between transport and logical channels, packet reassembly, deciphering, header decompression, and control signal processing to recover IP packets from the core network. The one or more processors 442 are also responsible for error detection.

Similar to the functionality described in connection with the downlink transmission by the base station 404, the one or more processors 442 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 404 may be used by the transmitter 414 to select the appropriate coding and modulation schemes, and to facilitate spatial processing. The spatial streams generated by the transmitter 414 may be provided to different antenna(s) 416. The transmitter 414 may modulate an RF carrier with a respective spatial stream for transmission.

The uplink transmission is processed at the base station 404 in a manner similar to that described in connection with the receiver function at the UE 402. The receiver 452 receives a signal through its respective antenna(s) 456. The receiver 452 recovers information modulated onto an RF carrier and provides the information to the one or more processors 484.

In the uplink, the one or more processors 484 provides demultiplexing between transport and logical channels, packet reassembly, deciphering, header decompression, control signal processing to recover IP packets from the UE 402. IP packets from the one or more processors 484 may be provided to the core network. The one or more processors 484 are also responsible for error detection.

For convenience, the UE 402, the base station 404, and/or the network entity 406 are shown in FIGS. 4A, 4B, and 4C as including various components that may be configured according to the various examples described herein. It will be appreciated, however, that the illustrated components may have different functionality in different designs. In particular, various components in FIGS. 4A to 4C are optional in alternative configurations and the various aspects include configurations that may vary due to design choice, costs, use of the device, or other considerations. For example, in case of FIG. 4A, a particular implementation of UE 402 may omit the WWAN transceiver(s) 410 (e.g., a wearable device or tablet computer or personal computer (PC) or laptop may have Wi-Fi and/or BLUETOOTH® capability without cellular capability), or may omit the short-range wireless transceiver(s) 420 (e.g., cellular-only, etc.), or may omit the satellite signal interface 430, or may omit the sensor(s) 444, and so on. In another example, in case of FIG. 4B, a particular implementation of the base station 404 may omit the WWAN transceiver(s) 450 (e.g., a Wi-Fi "hotspot" access point without cellular capability), or may omit the short-range wireless transceiver(s) 460 (e.g., cellular-only, etc.), or may omit the satellite signal interface 470, and so on. For brevity, illustration of the various alternative configurations is not provided herein, but would be readily understandable to one skilled in the art.

The various components of the UE 402, the base station 404, and the network entity 406 may be communicatively coupled to each other over data buses 408, 482, and 492, respectively. In some aspects, the data buses 408, 482, and 492 may form, or be part of, a communication interface of the UE 402, the base station 404, and the network entity 406, respectively. For example, where different logical entities are embodied in the same device (e.g., gNB and location server functionality incorporated into the same base station 404), the data buses 408, 482, and 492 may provide communication between them.

The components of FIGS. 4A, 4B, and 4C may be implemented in various ways. In some implementations, the components of FIGS. 4A, 4B, and 4C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 410 to 446 may be implemented by processor and memory component(s) of the UE 402 (e.g., by execution of appropriate code and/or by appropriate configuration of processor components). Similarly, some or all of the functionality represented by blocks 450 to 488 may be implemented by processor and memory component(s) of the base station 404 (e.g., by execution of appropriate code and/or by appropriate configuration of processor components). Also, some or all of the functionality represented by blocks 490 to 498 may be implemented by processor and memory component(s) of the network entity 406 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 402, base station 404, network entity 406, etc., such as the processors 442, 484, 494, the transceivers 410, 420, 450, and 460, the memories 440, 486, and 496, the ISAC component 448, 488, and 498, etc.

In some designs, the network entity 406 may be implemented as a core network component. In other designs, the network entity 406 may be distinct from a network operator or operation of the cellular network infrastructure (e.g., NG RAN 220 and/or 5GC 210/260). For example, the network entity 406 may be a component of a private network that may be configured to communicate with the UE 402 via the base station 404 or independently from the base station 404 (e.g., over a non-cellular communication link, such as Wi-Fi).

Wireless communication signals (e.g., radio frequency (RF) signals configured to carry orthogonal frequency division multiplexing (OFDM) symbols in accordance with a wireless communications standard, such as LTE, NR, etc.) transmitted between a UE and a base station can be used for environment sensing (also referred to as "RF sensing" or "wireless sensing"). Using wireless communication signals for environment sensing can be regarded as consumer-level wireless sensing with advanced detection capabilities that enable, among other things, touchless/device-free interaction with a device/system. The wireless communication signals may be cellular communication signals, such as LTE or NR signals, WLAN signals, such as Wi-Fi signals, etc. As a particular example, the wireless communication signals may be an OFDM waveform as utilized in LTE and NR. High-frequency communication signals, such as millimeter wave (mmW) RF signals, are especially beneficial to use as sensing signals because the higher frequency provides, at least, more accurate range (distance) detection.

Possible use cases of RF sensing include health monitoring use cases, such as heartbeat detection, respiration rate monitoring, and the like, gesture recognition use cases, such as human activity recognition, keystroke detection, sign language recognition, and the like, contextual information acquisition use cases, such as location detection/tracking, direction finding, range estimation, and the like, and automotive sensing use cases, such as smart cruise control, collision avoidance, and the like.

Figure 5A:
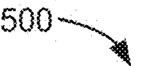
FIGS. 5A and 5B illustrate different types of wireless sensing, according to aspects of the disclosure.
Figure 5A:
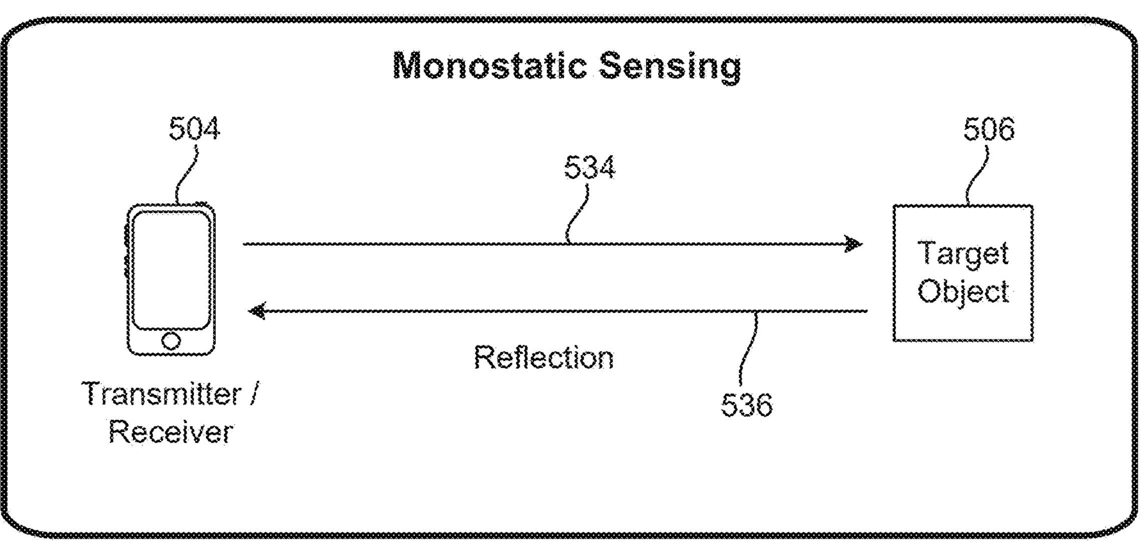
Figure 5B:
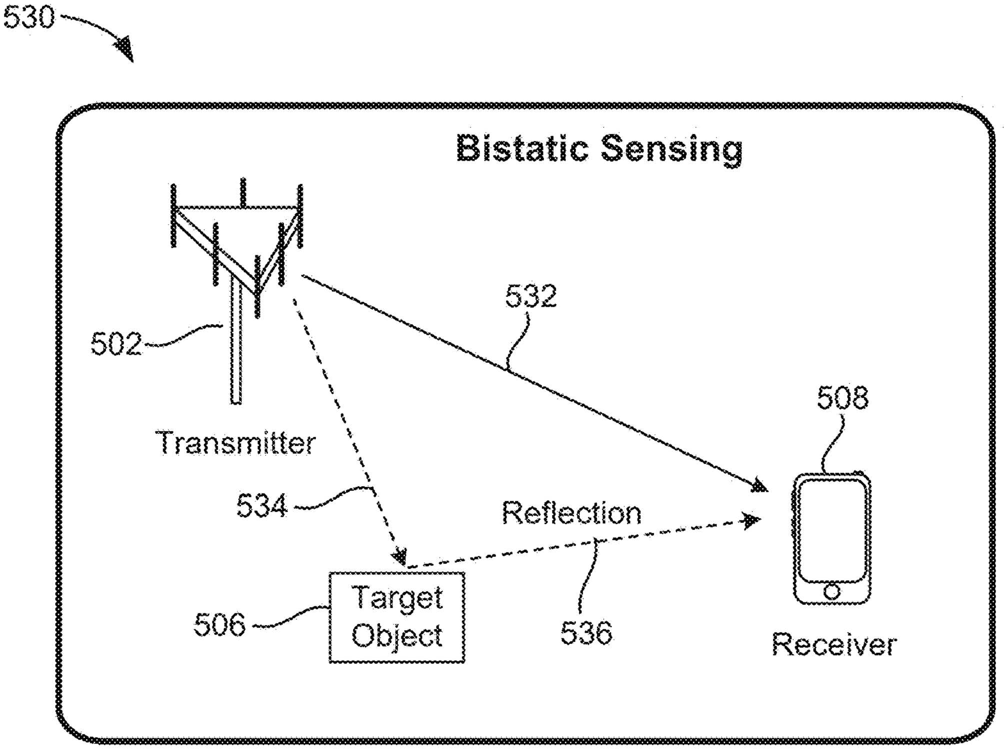

There are different types of sensing, including monostatic sensing (also referred to as "active sensing") and bistatic sensing (also referred to as "passive sensing"). FIGS. 5A and 5B illustrate these different types of sensing. Specifically, FIG. 5A is a diagram 500 illustrating a monostatic sensing scenario and FIG. 5B is a diagram 530 illustrating a bistatic sensing scenario. In FIG. 5A, the transmitter (Tx) and receiver (Rx) are co-located in the same sensing device 504 (e.g., a UE). The sensing device 504 transmits one or more RF sensing signals 534 (e.g., uplink or sidelink positioning reference signals (PRS) where the sensing device 504 is a UE), and some of the RF sensing signals 534 reflect off a target object 506 (e.g., an unmanned aerial vehicle (UAV)). The sensing device 504 can measure various properties (e.g., times of arrival (ToAs), angles of arrival (AoAs), phase shift, etc.) of the reflections 536 of the RF sensing signals 534 to determine characteristics of the target object 506 (e.g., size, shape, speed, motion state, etc.).

In FIG. 5B, the transmitter (Tx) and receiver (Rx) are not co-located, that is, they are separate devices (e.g., a UE and a base station). Note that while FIG. 5B illustrates using a downlink RF signal as the RF sensing signal 532, uplink RF signals or sidelink RF signals can also be used as RF sensing signals 532. In a downlink scenario, as shown, the transmitter device 502 is a base station (e.g., a gNB) and the receiver device 508 is a UE (e.g., a mobile phone, a V2X-capable vehicle, a roadside unit (RSU), etc.), whereas in an uplink scenario, the transmitter device 502 is a UE and the receiver device 508 is a base station. Where the transmitter device 502 is a base station and the receiver device 508 a UE, the sensing is referred to as UE-assisted sensing. In UE-assisted sensing, the position of receiver device 508 should be known by the network (e.g., by GPS or other UE positioning method).

Referring to FIG. 5B in greater detail, the transmitter device 502 transmits RF sensing signals 532 and 534 (e.g., positioning reference signals (PRS)) to the receiver device 508, but some of the RF sensing signals 534 reflect off a target object 506. The receiver device 508 (also referred to as the "sensing device") can measure the times of arrival (ToAs) of the RF sensing signals 532 received directly from the transmitter device 502 and the ToAs of the reflections 536 of the RF sensing signals 534 reflected from the target object 506.

More specifically, as described above, a transmitter device (e.g., a base station) may transmit a single RF signal or multiple RF signals to a receiver device (e.g., a UE). However, the receiver may receive multiple RF signals corresponding to each transmitted RF signal due to the propagation characteristics of RF signals through multipath channels. Each path may be associated with a cluster of one or more channel taps. Generally, the time at which the receiver detects the first cluster of channel taps is considered the ToA of the RF signal on the line-of-site (LOS) path (i.e., the shortest path between the transmitter and the receiver). Later clusters of channel taps are considered to have reflected off objects between the transmitter and the receiver and therefore to have followed non-LOS (NLOS) paths between the transmitter and the receiver.

Thus, referring back to FIG. 5B, the RF sensing signals 532 followed the LOS path between the transmitter device 502 and the receiver device 508, and the RF sensing signals 534 followed an NLOS path between the transmitter device 502 and the receiver device 508 due to reflecting off the target object 506. The transmitter device 502 may have transmitted multiple RF sensing signals 532, 534, some of which followed the LOS path and others of which followed the NLOS path. Alternatively, the transmitter device 502 may have transmitted a single RF sensing signal in a broad enough beam that a portion of the RF sensing signal followed the LOS path (RF sensing signal 532) and a portion of the RF sensing signal followed the NLOS path (RF sensing signal 534).

Based on the ToA of the LOS path, the ToA of the NLOS path, and the speed of light, the receiver device 508 can determine the distance to the target object(s). For example, the receiver device 508 can calculate the distance to the target object as the difference between the ToA of the LOS path and the ToA of the NLOS path multiplied by the speed of light. In addition, if the receiver device 508 is capable of receive beamforming, the receiver device 508 may be able to determine the general direction to a target object 506 as the direction (angle) of the receive beam on which the RF sensing signal following the NLOS path was received. That is, the receiver device 508 may determine the direction to the target object 506 as the AoA of the RF sensing signal, which is the angle of the receive beam used to receive the RF sensing signal. The receiver device 508 may then optionally report this information to the transmitter device 502, its serving base station, an application server associated with the core network, an external client, a third-party application, or some other sensing entity. Alternatively, the receiver device 508 may report the ToA measurements to the transmitter device 502, or other sensing entity (e.g., if the receiver device 508 does not have the processing capability to perform the calculations itself), and the transmitter device 502 may determine the distance and, optionally, the direction to the target object 506.

Note that if the RF sensing signals are uplink RF signals transmitted by a UE to a base station, the base station would perform object detection based on the uplink RF signals just like the UE does based on the downlink RF signals.

Like conventional wireless sensing, wireless communication-based sensing signals can be used to estimate the range (distance), velocity (Doppler), and angle (AoA) of a target object. However, the performance (e.g., resolution and maximum values of range, velocity, and angle) may depend on the design of the reference signal.

Figure 6:
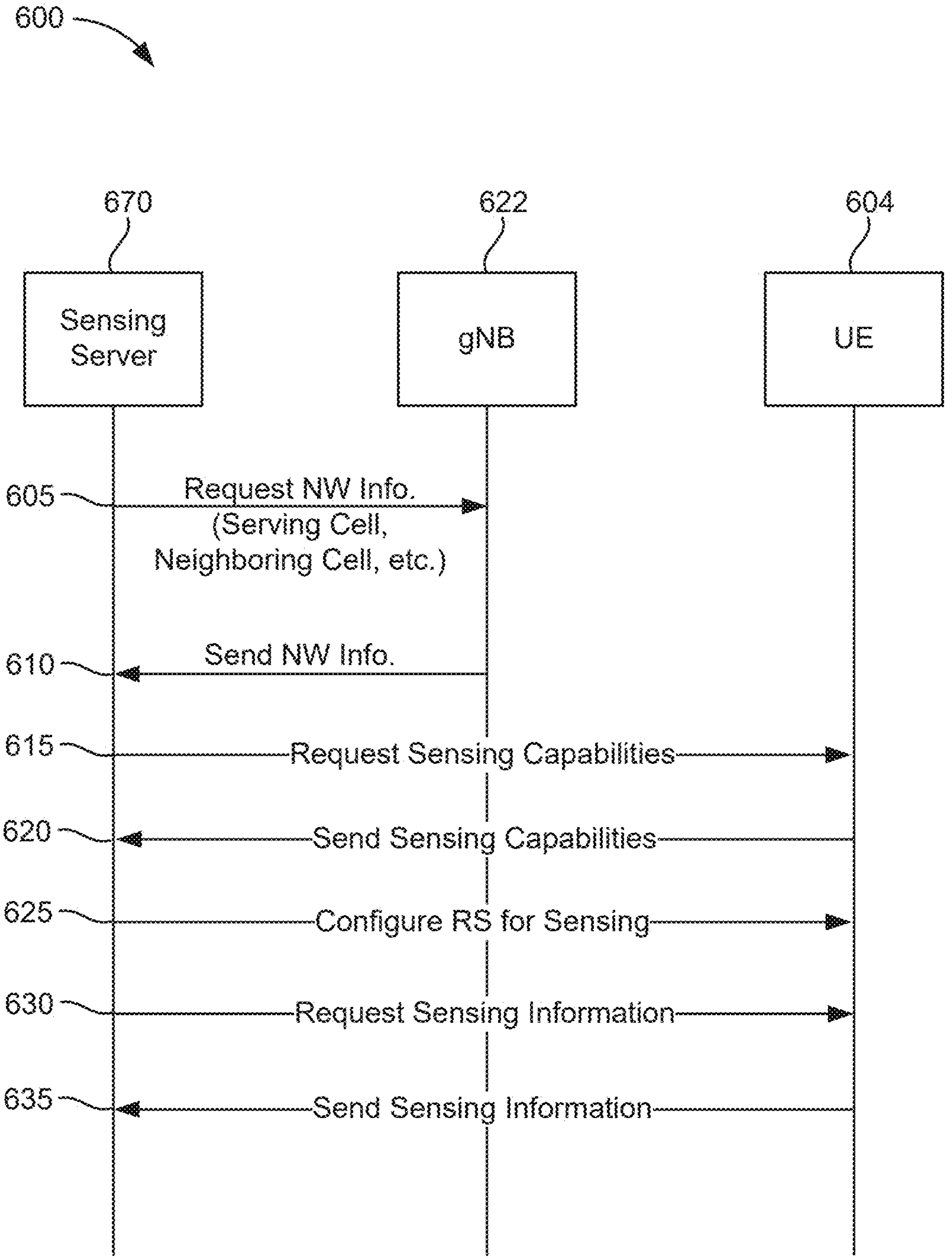
FIG. 6 illustrates an example call flow for a New Radio (NR)-based sensing procedure in which the network configures the sensing parameters, according to aspects of the disclosure.

FIG. 6 illustrates an example call flow 600 for an NR-based sensing procedure (e.g., a bistatic sensing procedure) in which the network configures the sensing parameters, according to aspects of the disclosure. Although FIG. 6 illustrates a network-coordinated sensing procedure, the sensing procedure could be coordinated over sidelink channels.

At stage 605, a sensing server 670 (e.g., inside or outside the core network) sends a request for network (NW) information to a gNB 622 (e.g., the serving gNB of a UE 604). The request may be for a list of the UE's 604 serving cell and any neighboring cells. At stage 610, the gNB 622 sends the requested information to the sensing server 670. At stage 615, the sensing server 670 sends a request for sensing capabilities to the UE 604. At stage 620, the UE 604 provides its sensing capabilities to the sensing server 670.

At stage 625, the sensing server 670 sends a configuration to the UE 604 indicating one or more reference signal (RS) resources that will be transmitted for sensing. The reference signal resources may be transmitted by the serving and/or neighboring cells identified at stage 610. In some cases, the NR-based sensing procedure illustrated in FIG. 6 may be a sensing-only procedure or a joint communication and sensing (JCS) procedure. In the case of a sensing-only procedure, the reference signal resources may be reference signal resources specifically configured for sensing purposes. In the case of a JCS procedure, the reference signal resources may be reference signal resources for communication that can also be used for sensing purposes. Alternatively, the reference signal resources for sensing may be multiplexed (e.g., time-division multiplexed) with reference signal resources for communication. For example, the reference signal resources for communication may be an orthogonal frequency division multiplexing (OFDM) waveform, while the reference signal resources for sensing may be a frequency modulation continuous wave (FMCW) waveform.

At stage 630, the sensing server 670 sends a request for sensing information to the UE 604. The UE 604 then measures the transmitted reference signals and, at stage 635, sends the measurements, or any sensing results determined from the measurements, to the sensing server 670.

In some aspects, the communication between the UE 604 and the sensing server 670 may be via the LTE positioning protocol (LPP). The communication between the sensing server 670 and the gNB may be via NR positioning protocol type A (NRPPa).

In some aspects, integrated sensing and communication (ISAC) functionalities are part of 5G Advanced and 6G communication systems for automotive use cases. In some aspects, a vehicle UE may perform object detection and tracking via radar sensing for driving assistance in an advanced driver assistance system (ADAS). It may be desirable for the vehicle UE to operate an ADAS and a high-speed WWAN communication system concurrently in some situations.

In some implementations, automotive frequency modulated continuous wave (FMCW) radars and cyclical prefix-orthogonal frequency division multiplexing (CP-OFDM) radars may operate in a millimeter wave band. The vehicle UE may perform in-band radar sensing using uplink (UL) WWAN (Uu) resources in the same frequency band used for UL communications.

When the vehicle UE performs in-band radar sensing using Uu resources, interference may occur between communication and radar systems. For example, interference may occur on symbols where simultaneous radar signal transmission and UL communication are scheduled. In some situations, at a system level (e.g., from a base station perspective), there may be concurrent UL communication and radar signal transmission (from different UEs in the coverage area of the base station) that may lead to interference.

In some aspects, kinematics information of vehicle UEs may be obtained from vehicle-to-everything (V2X) systems where multiple vehicle UE may share information with each other and with the infrastructure by using low-latency wireless communication technology. In some aspects, radar characteristics of the vehicle UEs may also be shared with each other and with the infrastructure in V2X systems. Such kinematics information and radar characteristics may be utilized to schedule the transmission of communication signals and the transmission of radar signals in UL resources efficiently while reducing intra-cell interference.

In some aspects, the vehicle UE may transmit to the base station (e.g., gNB) a scheduling request to perform one or more sensing operations, one or more communication operations, or a combination of the one or more sensing operations and the one or more communication operations. Upon receiving the request, the base station may approve or reject the request, for example, through radio resource control (RRC) signaling.

In some aspects, the vehicle UE may request a signal pattern of one or more specific radar sensors on the vehicle by using medium access control-control element (MAC-CE), for example. In some aspects, the scheduling request may include, for example, one or more beams to be used for radar sensing by one or more radar sensors on the vehicle, one or more signal patterns of the one or more radar sensors, time duration needed for the radar sensing, periodicity of sweeping through the beams, sequence of sweeping through the beams, time needed for each of the one or more beams, V2X identification (ID), V2X ID type, and/or other information.

In some aspects, the scheduling request may include one or more detailed parameters of time duration and periodicity needed for radar sensing. For example, for a vehicle capable of transmitting multiple beams for radar sensing, the scheduling request may include the symbol numbers and/or slot numbers on each beam. For example, the vehicle UE may request resources for front-facing and backward-facing radars for a total duration of L seconds, and more specifically, a slots for the front-facing radar and b slots for the backward-facing radar in that order, repeating with a periodicity of x slots, all within the L seconds of sensing duration.

In some aspects, the scheduling request may include V2X ID Type and V2X ID, which may be used by the base station (e.g., gNB) to correlate the vehicle UE's scheduling request with its basic safety messages (BSMs) for scheduling purposes. An example of V2X ID Type is a Layer 2 (L2) system resource controller (SRC) ID. In some aspects, the base station may assign resources to the vehicle UE for radar sensing via downlink control information (DCI) or radio resource control (RRC) signaling.

In some aspects, each of the vehicle UEs in the coverage area of a base station (e.g., gNB) may report to the base station one or more radar parameters of one or more radar sensors on the vehicle, including, for example, a number of radar sensors, a location of each of the radar sensors, a transmit power of each of the radar sensors, an angular coverage of each of the radar sensors, a signal pattern of each of the radar sensors, and/or other information indicating the radar sensing capabilities of the vehicle.

In some aspects, the vehicle UE may transmit a capability message that indicates the radar parameters of radar sensors on the vehicle to the base station. In some aspects, the capability message may be transmitted by the vehicle UE and received by the base station through RRC UE assistance information (UAI) or UE capability exchange.

In some aspects, scheduling of UL resources for vehicle UEs in the coverage area of a base station (e.g., gNB) may be affected by the location of the base station and relative locations of the vehicle UEs (which are performing UL communication and/or radar sensing operations) within the coverage area.

Figure 7:
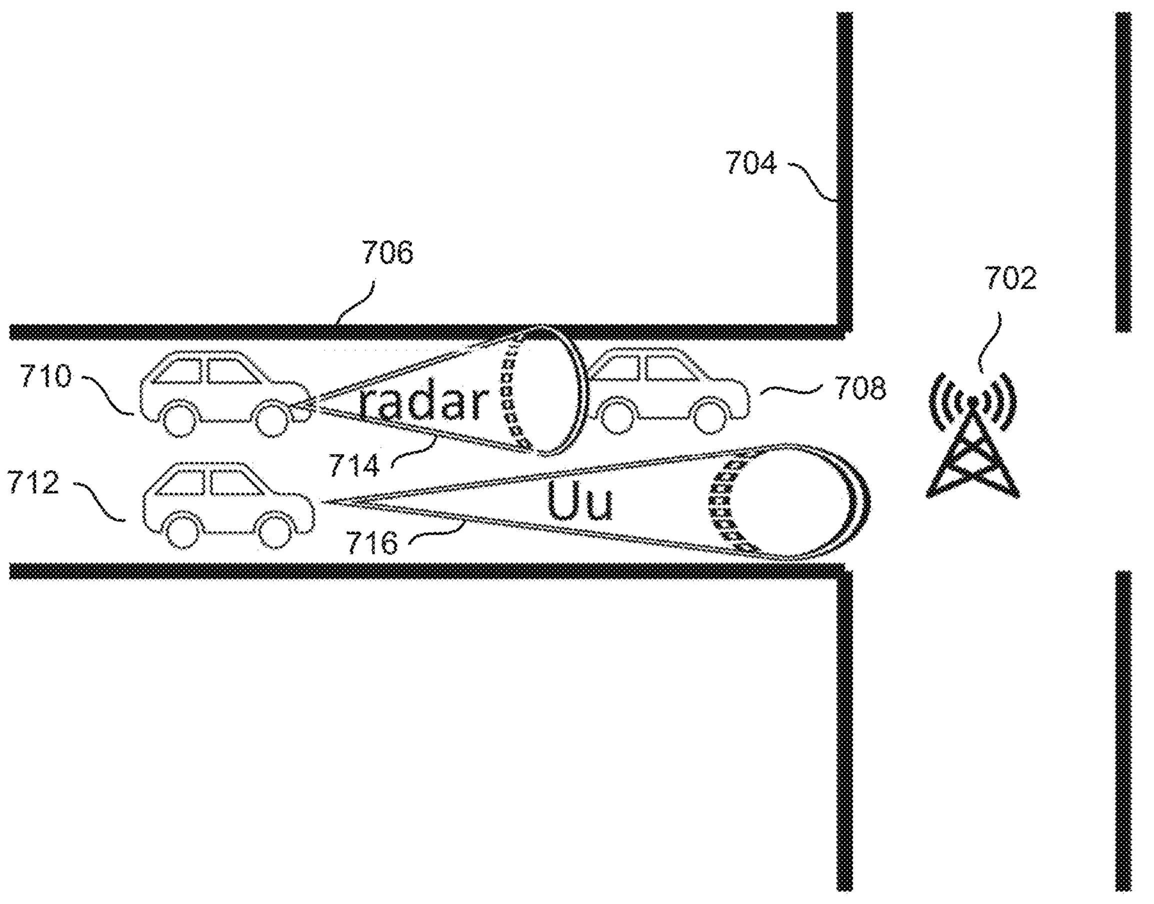
FIG. 7 illustrates a "worst" case scenario for radar-to-communication interference, according to aspects of the disclosure.

FIG. 7 illustrates a "worst" case scenario for radar-to-communication interference, according to aspects of the disclosure. In the scenario illustrated in FIG. 7, a base station 702 (e.g., gNB) is located at an intersection between two roads 704 and 706. An on-road object, which may be a first vehicle 708, is traveling on the road 706 in a direction toward the base station 702. A second vehicle 710 and a third vehicle 712 are both traveling on the same road 706 behind the first vehicle 708 in the same direction toward the base station 702.

In the scenario illustrated in FIG. 7, the second vehicle 710 may attempt to detect the first vehicle 708 in its front by transmitting a radar beam 714, while the third vehicle 712 may attempt to communicate with the base station 702 by transmitting a Uu beam 716. If the radar beam 714 and the Uu beam 716 are in the same frequency band, then interference between radar and uplink communication signal transmissions may be significant.

Figure 8:
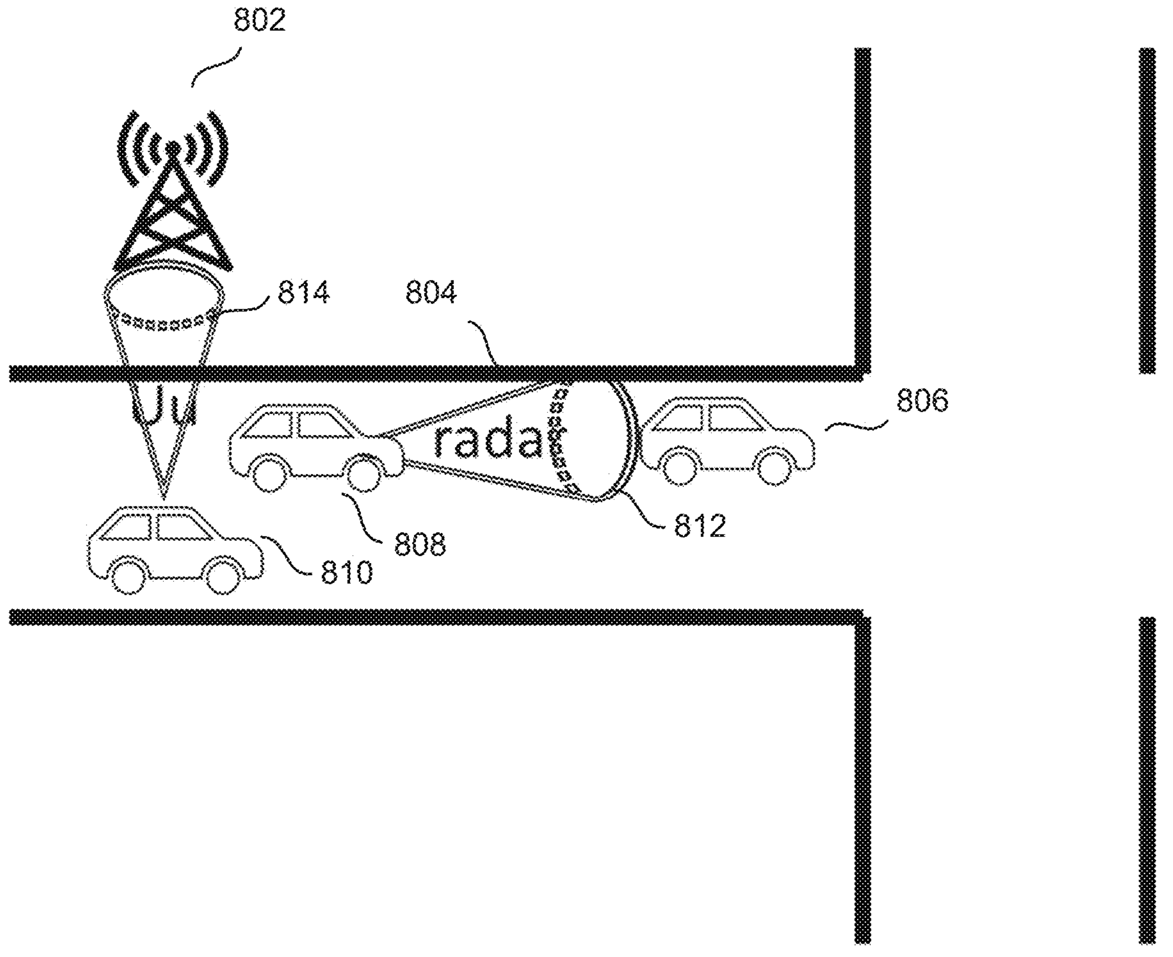
FIG. 8 illustrates a "best" case scenario for radar-to-communication interference, according to aspects of the disclosure.

FIG. 8 illustrates a "best" case scenario for radar-to-communication interference, according to aspects of the disclosure. In the scenario illustrated in FIG. 8, a base station 802 (e.g., gNB) is located at a side of a road 804. An on-road object, which may be a first vehicle 806, is traveling on the road 804 in a direction away from the base station 802. A second vehicle 808 and a third vehicle 810 are both traveling on the same road 804 behind the first vehicle 806 in the same direction.

In the scenario illustrated in FIG. 8, the second vehicle 808 may attempt to detect the first vehicle 806 in its front by transmitting a radar beam 812, while the third vehicle 810 may attempt to communicate with the base station 802 by transmitting a Uu beam 814. In this scenario, the Uu beam

814 transmitted by the third vehicle 810 may have little or no overlap with the radar beam 812 transmitted by the second vehicle 808.

Even in the "best" case scenario illustrated in FIG. 8, interference between the radar beam 812 transmitted by the second vehicle 808 and the Uu beam 814 transmitted by the third vehicle 810 may be insignificant only if the second vehicle 808 is attempting to detect vehicles on the road using a front-facing long-range radar (LRR) or medium range radar (MRR). If the second vehicle 808 is attempting to detect pedestrian or animal road intruders on the side of the road 804 using a short-range radar (SRR), however, interference may occur between radar beam transmission by the second vehicle 808 and the Uu beam transmission by the third vehicle 810, even though the SRR may have a relatively short detection range and relatively low transmit power.

In some aspects, upon receiving one or more scheduling requests and capability messages from one or more vehicle UEs, the base station (e.g., gNB) may decide whether to schedule radar transmissions and UL communications simultaneously based on V2X-obtained kinematics information and radar sensor information. In some aspects, the base station knows its own location and the location and/or heading of each of the vehicle UEs from BSM messages, as well as radar sensor information of each vehicle UE from each vehicle UE's capability message, for example, through a UAI or UE capability exchange.

In some aspects, scheduling of communication and radar signal transmissions may be based at least in part on the location and heading of each of the vehicle UEs, some of which may be attempting to perform uplink communication operations with the base station while others may be attempting to perform radar sensing operations.

Figure 9:
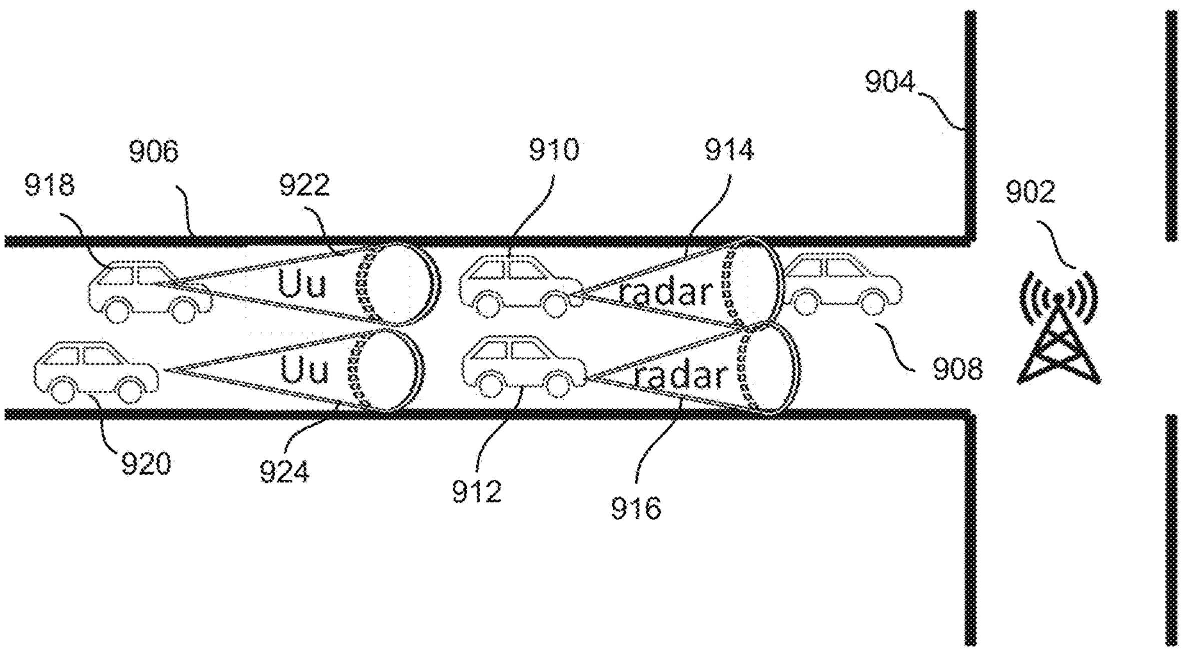
FIG. 9 illustrates a scenario of vehicle UEs, some of which are performing radar sensing operations while others are performing uplink communication operations, according to aspects of the disclosure.

FIG. 9 illustrates a scenario of vehicle UEs, some of which are performing radar sensing operations while others are performing uplink communication operations, according to aspects of the disclosure. In the scenario illustrated in FIG. 9, a base station 902 (e.g., gNB) is located at an intersection between two roads 904 and 906. An on-road object, which may be a first vehicle 908, is traveling on the road 906 in a direction toward the base station 902. A second vehicle 910 and a third vehicle 912 are both traveling on the same road 906 behind the first vehicle 908 in the same direction toward the base station 902.

In the scenario illustrated in FIG. 9, both the second vehicle 910 and the third vehicle 912 are performing radar sensing operations relatively close to the base station 902. The second vehicle 910 is transmitting a radar beam 914 and the third vehicle 912 is transmitting a radar beam 916 in the direction toward the base station 902 in an attempt to detect the first vehicle 908.

In this scenario, a fourth vehicle 918 and a fifth vehicle 920 are performing uplink communication operations with the base station 902. The fourth and fifth vehicles 918 and 920 are farther away from the base station 902 than the second and third vehicles 910 and 912. The fourth vehicle 918 is transmitting a Uu beam 922 and the fifth vehicle 920 is transmitting a Uu beam 924 in the direction toward the base station 902 in an attempt to communicate with the base station 902.

As illustrated in FIG. 9, the second, third, fourth and fifth vehicles 910, 912, 918, and 920 are transmitting signals in the same or substantially the same direction toward the base station 902. Because the second and third vehicles 910 and 912 are closer to the base station 902 than the fourth and fifth vehicles 918 and 920, the signal-to-interference-and-noise ratio (SINR) of the Uu beams 922 and 924 may be relatively low while radar-to-communication interference may be relatively high. In this scenario, the base station 902 may perform intra-cell time division multiplexing (TDM) to avoid concurrent transmissions of radar sensing signals by the second and third vehicles 910 and 912 and uplink communication signals by the fourth and fifth vehicles 918 and 920.

In some aspects, the width of each of the radar beams 914 and 916 may be considered to determine the SINRs of the Uu beams 922 and 924. For example, if the radar beams 914 and 916 are relatively sharp and narrow pencil beams directed toward the first vehicle 908, then the interference with the Uu beams 922 and 924 may be relatively small, thus resulting in relatively high SINRs.

In the scenario illustrated in FIG. 9, it is assumed that all the vehicles are moving toward the base station 902 and the radar and Uu beams are directed toward the base station 902. On a two-way road where vehicles closer to the base station are moving away from it and using their front-facing radar sensors (i.e., the radar beams pointing away from the base station), concurrent scheduling of radar and Uu transmissions may be possible if the SINRs of Uu transmissions are sufficiently high. In some aspects, the locations and directions of vehicles transmitting radar beams may be obtained through BSMs, for example.

Figure 10:
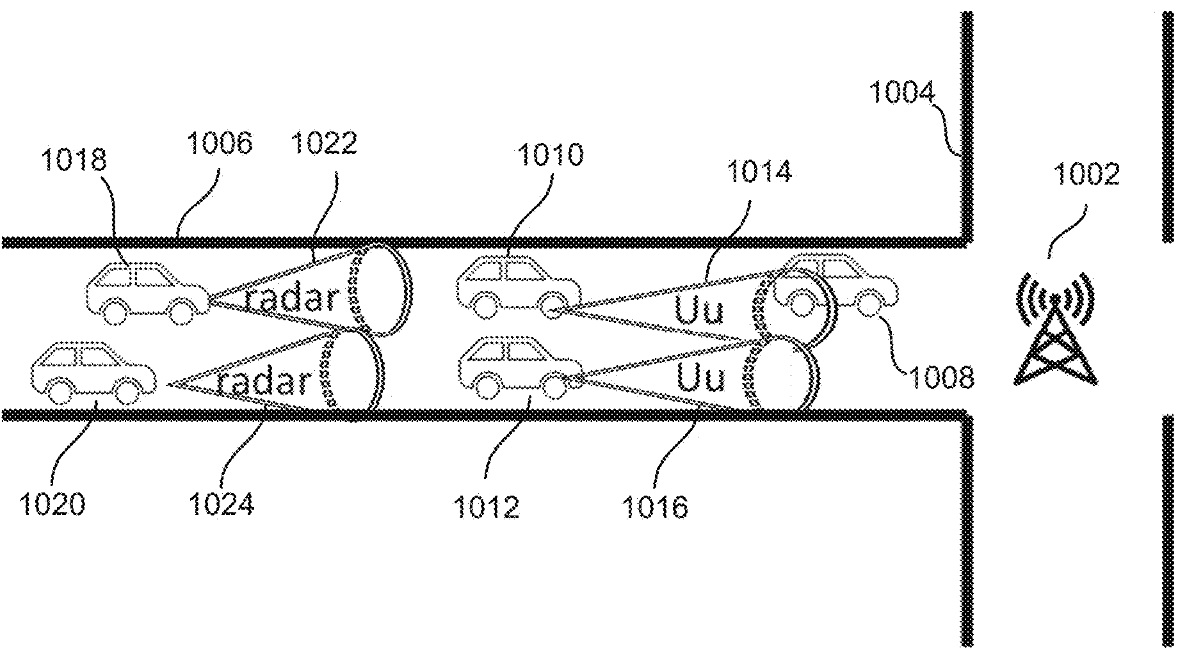
FIG. 10 illustrates another scenario of vehicle UEs, some of which are performing radar sensing operations while others are performing uplink communication operations, according to aspects of the disclosure.

FIG. 10 illustrates another scenario of vehicle UEs, some of which are performing radar sensing operations while others are performing uplink communication operations, according to aspects of the disclosure. In the scenario illustrated in FIG. 10, a base station 1002 (e.g., gNB) is located at an intersection between two roads 1004 and 1006. An on-road object, which may be a first vehicle 1008, is traveling on the road 1006 in a direction toward the base station 1002. A second vehicle 1010 and a third vehicle 1012 are both traveling on the same road 1006 behind the first vehicle 1008 in the same direction toward the base station 1002.

In the scenario illustrated in FIG. 10, both the second vehicle 1010 and the third vehicle 1012 are transmitting Uu beams 1014 and 1016, respectively, to the base station 1002 to perform uplink communication operations relatively close (e.g., within a threshold distance) to the base station 1002. In contrast, a fourth vehicle 1018 and a fifth vehicle 1020 are transmitting radar beams 1022 and 1024, respectively, in an attempt to detect one or more vehicles (e.g., vehicles 1008, 1010, and/or 1012) in front of them. In this scenario, the fourth and fifth vehicles 1018 and 1020 are farther away from the base station 1002 than the second and third vehicles 1010 and 1012.

As illustrated in FIG. 10, the second, third, fourth and fifth vehicles 1010, 1012, 1018 and 1020 are transmitting signals in the direction toward the base station 1002. Because the second and third vehicles 1010 and 1012 transmitting the Uu beams 1014 and 1016 are closer to the base station 1002 than the fourth and fifth vehicles 1018 and 1020 transmitting the radar beams 1022 and 1024, the SINR of the Uu beams 1014 and 1016 may be relatively high while radar-to-communication interference may be relatively low. In this scenario, the base station 1002 may schedule the transmissions of uplink communication signals by the second and third vehicles 1010 and 1012 and radar sensing signals by the fourth and fifth vehicles 1018 and 1020 simultaneously, based on a determination that the SINR is sufficiently high or the radar-to-communication interference is sufficiently low (e.g., below an interference threshold).

In some aspects, the base station 1002 may consider each vehicle's kinematics information, including the location and heading of each vehicle, which may be obtained through BSMs, for example, as well as information on the radar sensors obtained from each vehicle, for example, through a UAI or UE capability exchange, to schedule uplink communication and radar sensing signal transmissions efficiently.

In some aspects, the effect of radar-to-radar interference as well as radar-to-communication interference may be considered by the base station (e.g., gNB) for scheduling uplink communication and radar signal transmissions concurrently or in a time division multiplexed manner. In some aspects, BSM information may be utilized to enable efficient spatial multiplexing by taking into consideration both radar-to-communication and radar-to-radar interference.

Figure 11A:
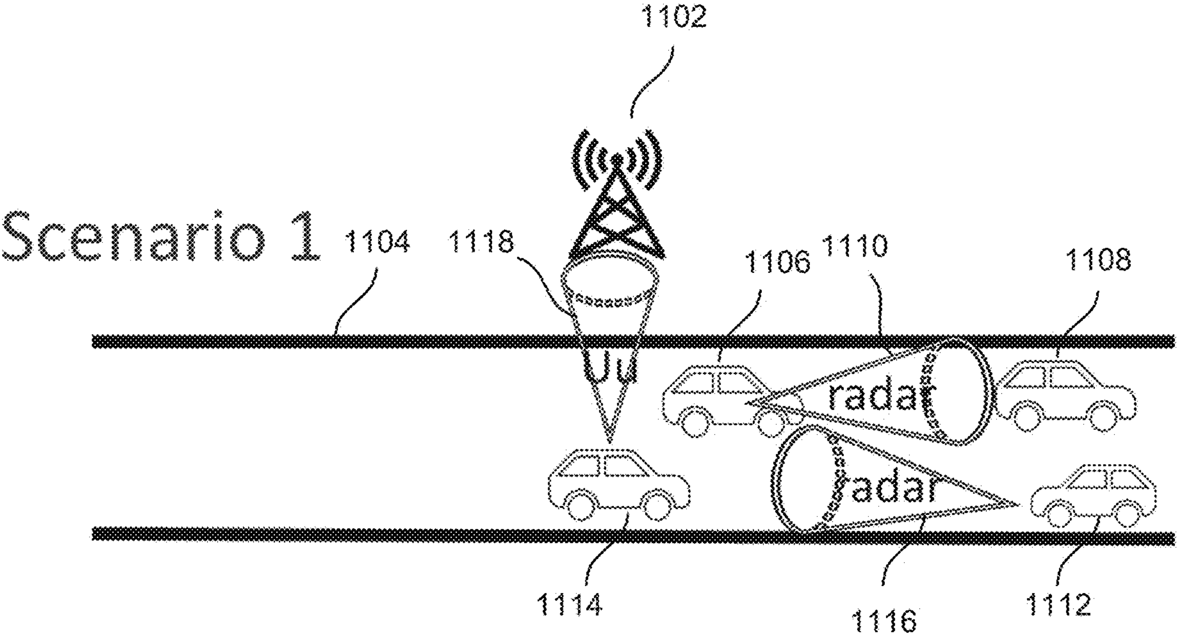
FIGS. 11A, 11B, and 11C illustrate three example scenarios of vehicle locations and headings which may enable spatial multiplexing for communication and radar signal transmissions, according to aspects of the disclosure.
Figure 11B:
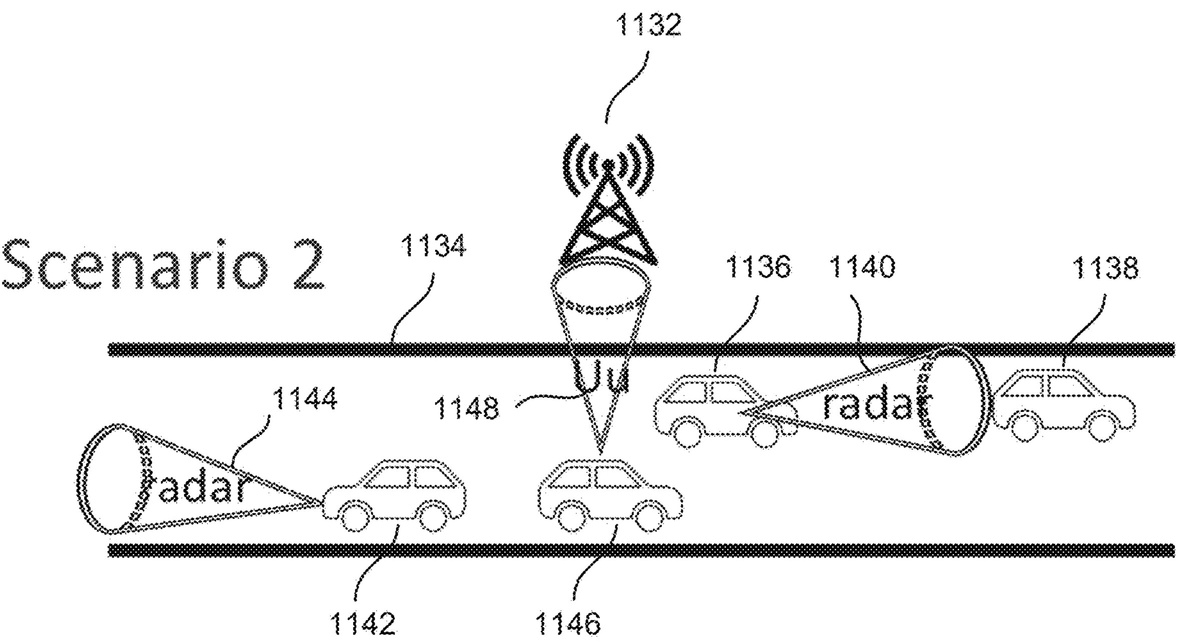
Figure 11C:
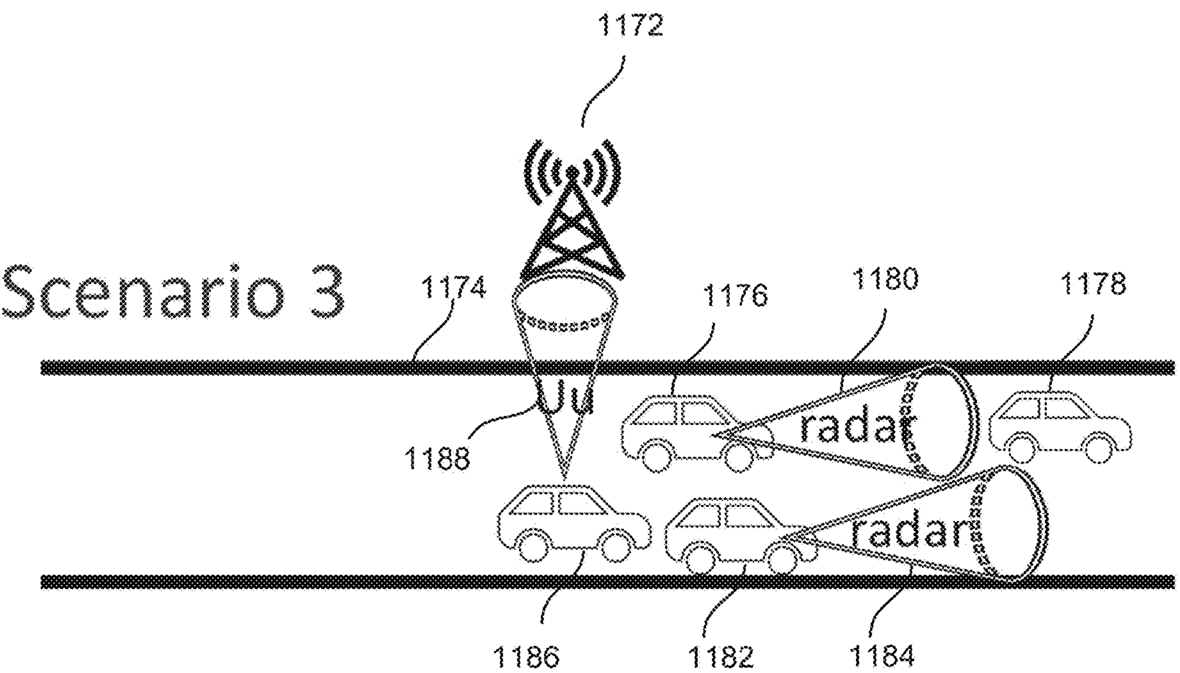

FIGS. 11A, 11B, and 11C illustrate three example scenarios of vehicle locations and headings which may enable spatial multiplexing for communication and radar signal transmissions, according to aspects of the disclosure. In order to avoid radar-to-radar interference, for example, the transmit antenna of the radar sensor of one UE may not point at the receive antenna of the radar sensor of another UE.

FIG. 11A illustrates a first scenario (denoted "Scenario 1") according to aspects of the disclosure. In this scenario, a base station 1102 (e.g., gNB) may be located on the side of a road 1104. A first vehicle 1106 may attempt to use its radar to detect a second vehicle 1108 in front of it, using a first radar beam 1110. Meanwhile, a third vehicle 1112 may attempt to use its radar to detect a fourth vehicle 1114 in front of it, using a second radar beam 1116. The first vehicle 1106 and the third vehicle 1112 are traveling in opposite directions.

Although neither the first radar beam 1110 nor the second radar beam 1116 is directed toward the base station 1102, the first vehicle 1106 and the third vehicle 1112 may not be granted the same time-frequency resources because the radar transmitter of the first vehicle 1106 interferes with the radar receiver of the third vehicle 1112, and likewise, the radar transmitter of the third vehicle 1112 interferes with the radar receiver of the first vehicle 1106.

In the first scenario illustrated in FIG. 11A, the fourth vehicle 1114 may attempt to perform uplink communication operations with the base station 1102, using a Uu beam 1118. In this scenario, the Uu beam 1118 is substantially perpendicular to and thus does not coincide with the first radar beam 1110 or the second radar beam 1116. Although the first vehicle 1106 and the third vehicle 1112 may not be permitted to perform radar sensing operations simultaneously using the same time-frequency resources, the same time-frequency resources may be assigned to the first vehicle 1106 (or to the third vehicle 1112, but not simultaneously to both vehicles 1106 and 1112) for radar sensing operations and to the fourth vehicle 1114 for UL communications with the base station 1102.

FIG. 11B illustrates a second scenario (denoted "Scenario 2") according to aspects of the disclosure. In this scenario, a base station 1132 (e.g., gNB) may be located on the side of a road 1134 similar to FIG. 11A. A first vehicle 1136 may attempt to use its radar to detect a second vehicle 1138 in front of it, using a first radar beam 1140. Meanwhile, a third vehicle 1142 may attempt to use its radar to detect any object (not shown) in front of it, using a second radar beam 1144. The first vehicle 1136 and the third vehicle 1142 are traveling in opposite directions. Since the first vehicle 1136 and the third vehicle 1142 are moving away from each other and their radar beams 1140 and 1144 are not directed toward each other, the first vehicle 1136 and the third vehicle 1142 may be granted the same time-frequency resources for simultaneous radar sensing operations.

In the scenario illustrated in FIG. 11B, a fourth vehicle 1146 may attempt to perform uplink communication operations with the base station 1132, using a Uu beam 1148. In this scenario, the Uu beam 1148 does not coincide with the first radar beam 1140 or the second radar beam 1144. Thus, the same time-frequency resources may be assigned to both the first vehicle 1136 and the third vehicle 1142 for radar sensing operations and to the fourth vehicle 1146 for UL communications with the base station 1132.

FIG. 11C illustrates a third scenario (denoted "Scenario 3") according to aspects of the disclosure. In this scenario, a base station 1172 (e.g., gNB) may be located on the side of a road 1174 similar to FIGS. 11A and 11B. A first vehicle 1176 may attempt to use its radar to detect a second vehicle 1178 in front of it, using a first radar beam 1180. Meanwhile, a third vehicle 1182, traveling in the same direction parallel to the first vehicle 1176, may attempt to use its radar to detect any vehicle in front of it, using a second radar beam 1184.

In the scenario illustrated in FIG. 11C, radar signals transmitted by the first vehicle 1176 may be reflected by the second vehicle 1178 and received by the third vehicle 1182. Likewise, radar signals transmitted by the third vehicle 1182 may be reflected by the first vehicle 1178 and received by the first vehicle 1176. Thus, there may be indirect interference between the radar transmitters and receivers of the first vehicle 1176 and the third vehicle 1182 even though they are not traveling toward each other. In some aspects, Scenario 3 may be treated in the same manner as Scenario 1, that is, simultaneous radar sensing operations by the first vehicle 1176 and the third vehicle 1182 are not permitted.

In Scenario 3, as illustrated in FIG. 11C, a fourth vehicle 1186 may attempt to perform uplink communication operations with the base station 1172, using a Uu beam 1188. In this scenario, the Uu beam 1188 does not coincide with the first radar beam 1180 or the second radar beam 1184. Although the first vehicle 1176 and the third vehicle 1182 may not be permitted to perform radar sensing simultaneously using the same time-frequency resources, the same time-frequency resources may be assigned to the first vehicle 1176 (or to the third vehicle 1182, but not simultaneously to both vehicles 1176 and 1182) for radar sensing operations and to the fourth vehicle 1186 for UL communications with the base station 1172.

In some aspects, instead of having the base station (e.g., gNB) make binary decisions on either permitting or denying concurrent uplink communications and radar sensing based on kinematics information obtained through V2X (e.g., through BSMs) and radar sensing characteristics obtained from vehicle UEs (e.g., through UAI or UE capability exchange), dynamic link adaptation may be provided to allocate sensing resources and communication resources dynamically for vehicle UEs within the coverage area of the base station. For example, the base station may allocate one or more resources for one or more communication operations dynamically based on an amount of interference from one or more radar sensing operations.

In some aspects, the base station may tune a physical resource block (PRB) allocation and/or a modulation and coding scheme (MCS) allocation for one or more uplink communication operations based on the amount of interference incurred by radar sensing operations. In some aspects, a threshold level of interference may be set for the base station. If the expected amount of interference from radar sensing operations is above the threshold level, then the base station may not schedule uplink communications and radar sensing operations concurrently. On the other hand, if the expected amount of interference from radar sensing operations is below the threshold level, the base station may allow concurrent scheduling of uplink communications and radar sensing operations by dynamically allocating PRB and/or MCS for uplink communications.

In some aspects, a relatively low MCS allocation and a relatively high PRB allocation for uplink communications may be used when the expected amount of interference from radar sensing operations is relatively high (although below the threshold level). For example, when BSMs received from sensing vehicles indicate close proximity to an intersection where a base station is located, and those sensing vehicles are using high-power directional LRRs, the expected amount of interference from radar sensing operations may be relatively high. In this situation, the base station may dynamically tune the MCS allocation lower and the PRB allocation higher accordingly.

On the other hand, when BSMs received from sensing vehicles indicate that those sensing vehicles are moving farther away from the intersection, the base station may dynamically tune the MCS allocation higher and the PRB allocation lower when the expected amount of interference from radar sensing operations is lower.

Figure 12:
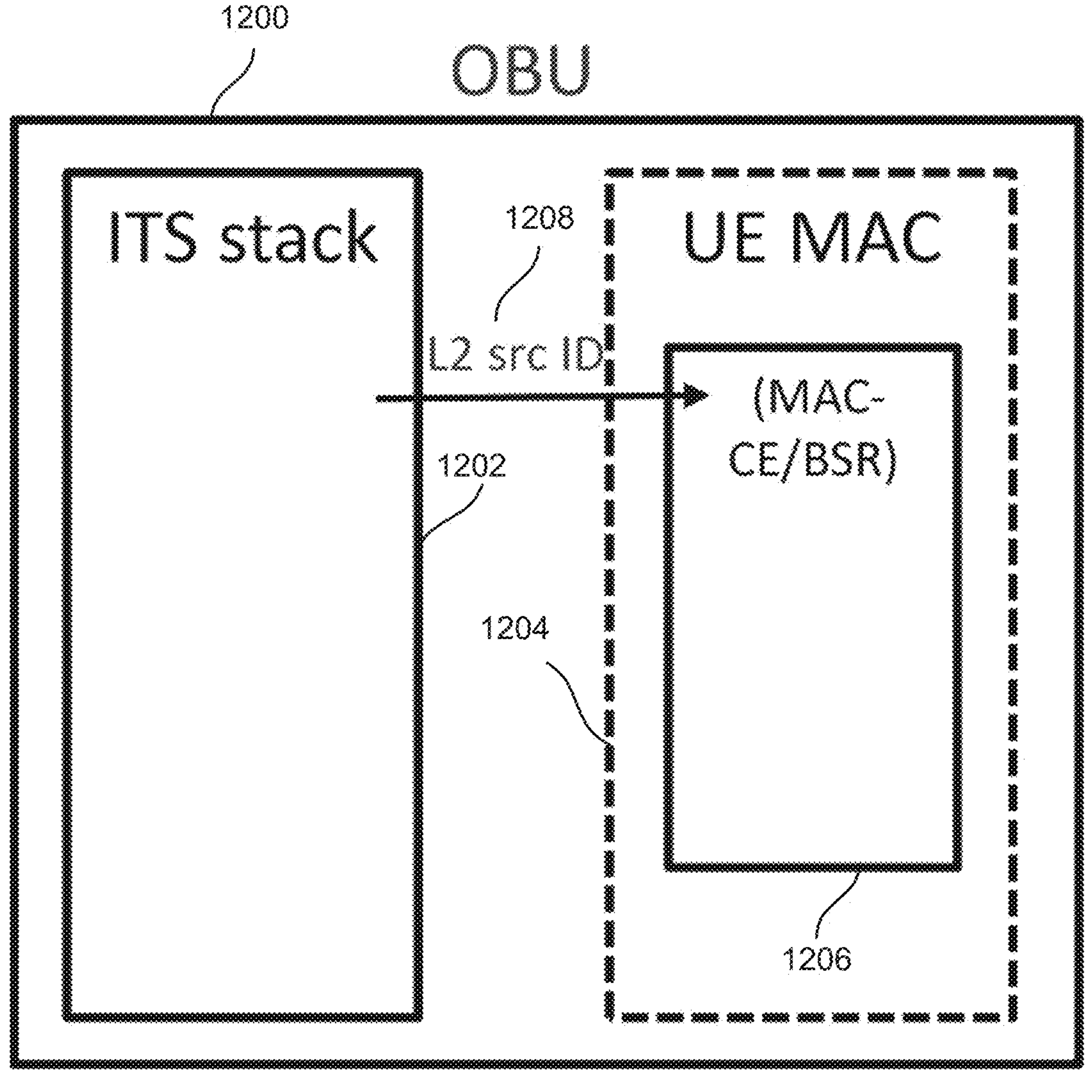
FIG. 12 illustrates an example on board unit (OBU) of a vehicle UE, according to aspects of the disclosure.

FIG. 12 illustrates an example on board unit (OBU) 1200 of a vehicle UE, according to aspects of the disclosure. In this example, an L2 stack, such as an intelligent transportation system (ITS) stack 1202, and UE MAC 1204, which may include MAC-CE and/or buffer status report (BSR) 1206, are provided in the OBU 1200. In some aspects, scheduling requests for radar sensing and/or uplink communication operations may be communicated to a base station (e.g., gNB) through a logical channel, for example, through the MAC layer. In some aspects, a scheduling request may include a V2X ID which is an L2 SRC ID 1208, for example.

Figure 13:
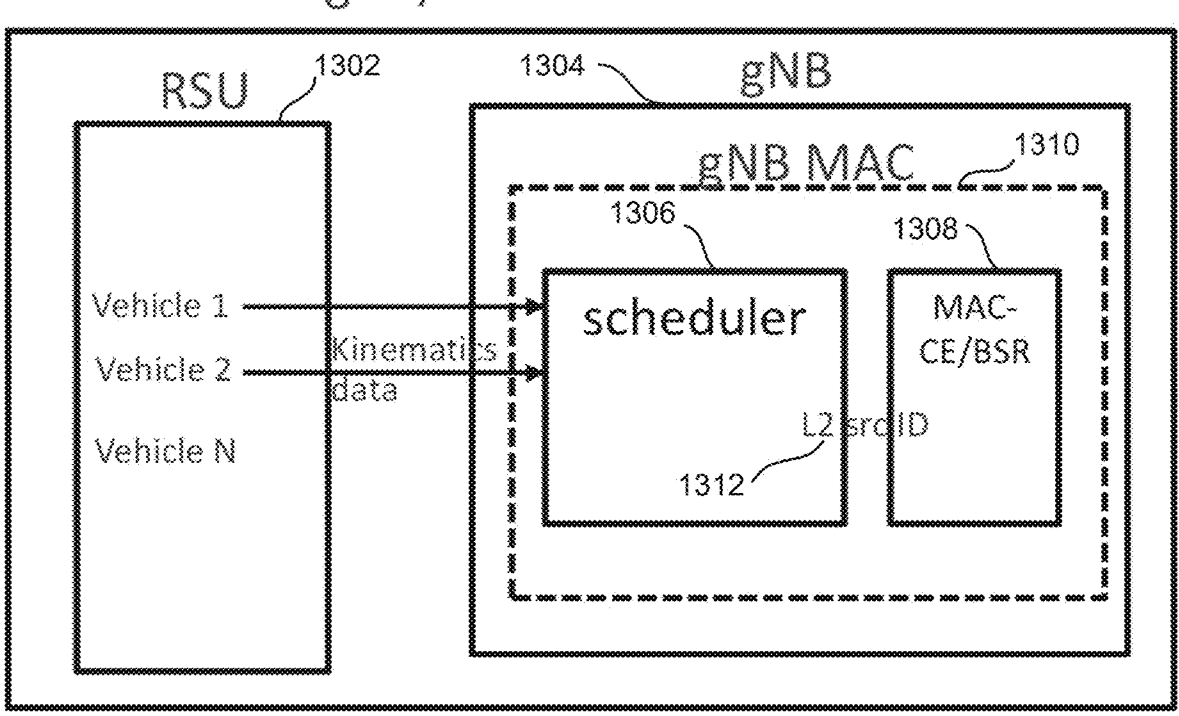
FIG. 13 illustrates an example road side unit (RSU) and an example base station, according to aspects of the disclosure.

FIG. 13 illustrates an example road side unit (RSU) 1302 and an example base station (e.g., gNB 1304), according to aspects of the disclosure. In some aspects, the RSU 1302 may provide kinematics data of vehicles (e.g., Vehicle 1, Vehicle 2, . . . . Vehicle N), including the vehicles' L2 SRC IDs, positions, headings, and/or other information, to a scheduler 1306 in the gNB 1304. The scheduler 1306 then correlates kinematics data of the vehicles with radar sensing requests obtained from vehicle UEs through MAC-CE/BSR 1308 which, along with the scheduler 1306, is part of a gNB MAC layer functionality 1310.

In some aspects, radar sensing requests from vehicle UEs may include the L2 SRC IDs 1312 of the corresponding BSMs. In some aspects, the gNB 1304 may use vehicle kinematics information (e.g., through V2X), along with radar sensor information (e.g., through UAI or UE capability exchange), for efficient scheduling of radar sensing and UL communication operations, by taking into account both radar-to-communication and radar-to-radar interference among the vehicle UEs.

FIG. 14 illustrates an example method 1400 of configuring vehicle sensing and communication, according to aspects of the disclosure. In some aspects, method 1400 may be performed by a network node (e.g., base station 404 described herein).

At 1410, the network node may receive, from a road side unit (RSU), a plurality of basic safety messages (BSMs) transmitted by a plurality of vehicles.

Means for performing the operation of block 1410 may include the processor(s), memory, or transceiver(s) of any of the base station 404 described herein. For example, the operation of block 1410 may be performed by the one or more WWAN transceivers 450, the one or more short-range wireless transceivers 460, the one or more processors 484, memory 486, and/or ISAC component 488, any or all of which may be considered means for performing this operation.

At 1420, the network node may receive, from a first vehicle of the plurality of vehicles, a scheduling request to perform one or more sensing operations, one or more communication operations, or a combination of the one or more sensing operations and the one or more communication operations.

Means for performing the operation of block 1420 may include the processor(s), memory, or transceiver(s) of any of the base station 404 described herein. For example, the operation of block 1420 may be performed by the one or more WWAN transceivers 450, the one or more short-range wireless transceivers 460, the one or more processors 484, memory 486, and/or ISAC component 488, any or all of which may be considered means for performing this operation.

At 1430, the network node may transmit, to the first vehicle, a first configuration to perform the one or more sensing operations, the one or more communication operations, or the combination based on the plurality of BSMs and one or more scheduling requests from one or more other vehicles of the plurality of vehicles.

Means for performing the operation of block 1430 may include the processor(s), memory, or transceiver(s) of any of the base station 404 described herein. For example, the operation of block 1430 may be performed by the one or more WWAN transceivers 450, the one or more short-range wireless transceivers 460, the one or more processors 484, memory 486, and/or ISAC component 488, any or all of which may be considered means for performing this operation.

Method 1400 may include additional implementations, such as any single implementation or any combination of implementations described below and/or in connection with one or more other processes described elsewhere herein.

In some aspects, method 1400 includes receiving, from the first vehicle, a capability message indicating one or more radar parameters of the first vehicle.

In some aspects, the one or more radar parameters include a number of radar sensors, a location of each of one or more radar sensors, a transmit power of each of the one or more radar sensors, an angular coverage of each of the one or more radar sensors, a signal pattern of each of the one or more radar sensors, or any combination thereof.

In some aspects, the capability message is received through radio resource control (RRC) user equipment (UE) assistance information (UAI) or UE capability exchange.

In some aspects, the scheduling request includes one or more beams to be used for radar sensing by one or more radar sensors of the first vehicle, one or more signal patterns of the one or more radar sensors, time duration needed for the radar sensing, periodicity of sweeping through the one or more beams, sequencing of sweeping through the one or more beams, time needed on each of the one or more beams, a vehicle-to-everything (V2X) identification (ID), a V2X ID type, or any combination thereof.

In some aspects, the first configuration is transmitted through downlink control information (DCI) or radio resource control (RRC) signaling.

In some aspects, the plurality of BSMs include kinematics information of the first vehicle, further comprising receiving radar sensor information of the first vehicle, determining whether the first vehicle is permitted to perform the one or more sensing operations and the one or more communication operations simultaneously based on the kinematics information and the radar sensor information, and scheduling the one or more sensing operations and the one or more communication operations simultaneously for the first vehicle based on a determination that the first vehicle is permitted to perform the one or more sensing operations and the one or more communication operations simultaneously.

In some aspects, method 1400 includes scheduling the one or more sensing operations and the one or more communication operations at different times for the first vehicle based on a determination that the first vehicle is not permitted to perform the one or more sensing operations and the one or more communication operations simultaneously.

In some aspects, scheduling the one or more sensing operations and the one or more communication operations at different times comprises performing intra-cell time division multiplexing (TDM) of the one or more sensing operations and the one or more communication operations.

In some aspects, determining whether the first vehicle is permitted to perform the one or more sensing operations and the one or more communication operations simultaneously comprises determining a signal to interference and noise ratio (SINR) of one or more radar sensors of the first vehicle.

In some aspects, determining whether the first vehicle is permitted to perform the one or more sensing operations and the one or more communication operations simultaneously further comprises determining one or more widths of one or more beams of the one or more radar sensors.

In some aspects, method 1400 includes transmitting, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

In some aspects, the spatial multiplexing is based on radar-to-radar interference between the first vehicle and the second vehicle, radar-to-communication interference between the first vehicle and the second vehicle, radar-to-radar interference between the first vehicle or the second vehicle and the one or more other vehicles of the plurality of vehicles, radar-to-communication interference between the first vehicle or the second vehicle and the one or more other vehicles of the plurality of vehicles, or any combination thereof.

In some aspects, method 1400 includes allocating one or more resources for the one or more communication operations dynamically based on an amount of interference from the one or more sensing operations.

In some aspects, allocating the one or more resources for the one or more communication operations comprises a physical resource block (PRB) allocation or a modulation and coding scheme (MCS) allocation for the one or more communication operations.

Although FIG. 14 shows example blocks of method 1400, in some implementations, method 1400 may include additional blocks, fewer blocks, different blocks, or differently arranged blocks than those depicted in FIG. 14. Additionally, or alternatively, two or more of the blocks of method 1400 may be performed in parallel, or performed in a sequence different from the sequence listed in FIG. 14.

As will be appreciated, a technical advantage of the method 1400 is efficient scheduling of radar sensing and communication operations by multiple vehicle UEs within the coverage arca of a base station. By considering radar-to-radar and radar-to-communication interference among the vehicle UEs, concurrent scheduling of both radar sensing and communication operations may be realized in some situations. In situations where concurrent radar sensing and communication operations are not feasible, time division multiplexing, spatial division multiplexing, or a combination of both may be performed by the base station for efficient scheduling of radar sensing and communication operations.

FIG. 15 illustrates an example method 1500 of performing one or more integrated sensing and communication (ISAC) operations, according to aspects of the disclosure. In some aspects, method 1500 may be performed by a vehicle (e.g., UE 402 described herein).

At 1510, the vehicle may transmit, to a network node, a scheduling request to perform one or more sensing operations, one or more communication operations, or a combination of the one or more sensing operations and the one or more communication operations.

Means for performing the operation of block 1510 may include the processor(s), memory, or transceiver(s) of any of the UE 402 described herein. For example, the operation of block 1510 may be performed by the one or more WWAN transceivers 410, the one or more short-range wireless transceivers 420, the one or more processors 442, memory 440, and/or ISAC component 448, any or all of which may be considered means for performing this operation.

At 1520, the vehicle may receive, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Means for performing the operation of block 1520 may include the processor(s), memory, or transceiver(s) of any of the UE 402 described herein. For example, the operation of block 1520 may be performed by the one or more WWAN transceivers 410, the one or more short-range wireless transceivers 420, the one or more processors 442, memory 440, and/or ISAC component 448, any or all of which may be considered means for performing this operation.

Method 1500 may include additional implementations, such as any single implementation or any combination of implementations described below and/or in connection with one or more other processes described elsewhere herein.

In some aspects, method 1500 includes transmitting, to the network node, a capability message indicating one or more radar parameters of the vehicle.

In some aspects, the one or more radar parameters include a number of radar sensors, a location of each of one or more radar sensors, a transmit power of each of the one or more radar sensors, an angular coverage of each of the one or more radar sensors, a signal pattern of each of the one or more radar sensors, or any combination thereof.

In some aspects, the capability message is transmitted through radio resource control (RRC) user equipment (UE) assistance information (UAI) or UE capability exchange.

In some aspects, the scheduling request includes one or more beams to be used for radar sensing by one or more radar sensors of the vehicle, one or more signal patterns of the one or more radar sensors, time duration needed for the radar sensing, periodicity of sweeping through the one or more beams, sequencing of sweeping through the one or more beams, time needed on each of the one or more beams, a vehicle-to-everything (V2X) identification (ID), a V2X ID type, or any combination thereof.

In some aspects, the configuration is received through downlink control information (DCI) or radio resource control (RRC) signaling.

Although FIG. 15 shows example blocks of method 1500, in some implementations, method 1500 may include additional blocks, fewer blocks, different blocks, or differently arranged blocks than those depicted in FIG. 15. Additionally, or alternatively, two or more of the blocks of method 1500 may be performed in parallel, or performed in a sequence different from the sequence listed in FIG. 15.

As will be appreciated, a technical advantage of the method 1500 is that, by transmitting a scheduling request and a capability message indicating one or more radar sensing parameters, the vehicle UE allows the base station to schedule radar sensing and communication operations by multiple vehicle UEs within the coverage area of the base station efficiently. By considering radar-to-radar and radar-to-communication interference among the vehicle UEs, concurrent scheduling of both radar sensing and communication operations may be realized in some situations. In situations where concurrent radar sensing and communication operations are not feasible, time division multiplexing, spatial division multiplexing, or a combination of both may be performed by the base station for efficient scheduling of radar sensing and communication operations.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of configuring vehicle sensing and communication at a network node, comprising: receiving, from a road side unit (RSU), a plurality of basic safety messages (BSMs) transmitted by a plurality of vehicles; receiving, from a first vehicle of the plurality of vehicles, a scheduling request to perform one or more sensing operations, one or more communication operations, or a combination of the one or more sensing operations and the one or more communication operations; and transmitting, to the first vehicle, a first configuration to perform the one or more sensing operations, the one or more communication operations, or the combination based on the plurality of BSMs and one or more scheduling requests from one or more other vehicles of the plurality of vehicles.

Clause 2. The method of clause 1, further comprising: receiving, from the first vehicle, a capability message indicating one or more radar parameters of the first vehicle.

Clause 3. The method of clause 2, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 4. The method of any of clauses 2 to 3, wherein the capability message is received through radio resource control (RRC) user equipment (UE) assistance information (UAI) or UE capability exchange.

Clause 5. The method of any of clauses 1 to 4, wherein the scheduling request includes: one or more beams to be used for radar sensing by one or more radar sensors of the first vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 6. The method of any of clauses 1 to 5, wherein the first configuration is transmitted through downlink control information (DCI) or radio resource control (RRC) signaling.

Clause 7. The method of any of clauses 1 to 6, wherein the plurality of BSMs include kinematics information of the first vehicle, further comprising: receiving radar sensor information of the first vehicle; determining whether the first vehicle is permitted to perform the one or more sensing operations and the one or more communication operations simultaneously based on the kinematics information and the radar sensor information; and scheduling the one or more sensing operations and the one or more communication operations simultaneously for the first vehicle based on a determination that the first vehicle is permitted to perform the one or more sensing operations and the one or more communication operations simultaneously.

Clause 8. The method of clause 7, further comprising: scheduling the one or more sensing operations and the one or more communication operations at different times for the first vehicle based on a determination that the first vehicle is not permitted to perform the one or more sensing operations and the one or more communication operations simultaneously.

Clause 9. The method of clause 8, wherein scheduling the one or more sensing operations and the one or more communication operations at different times comprises: performing intra-cell time division multiplexing (TDM) of the one or more sensing operations and the one or more communication operations.

Clause 10. The method of any of clauses 7 to 9, wherein determining whether the first vehicle is permitted to perform the one or more sensing operations and the one or more communication operations simultaneously comprises: determining a signal to interference and noise ratio (SINR) of one or more radar sensors of the first vehicle.

Clause 11. The method of clause 10, wherein determining whether the first vehicle is permitted to perform the one or more sensing operations and the one or more communication operations simultaneously further comprises: determining one or more widths of one or more beams of the one or more radar sensors.

Clause 12. The method of any of clauses 1 to 11, further comprising: transmitting, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

Clause 13. The method of clause 12, wherein the spatial multiplexing is based on: radar-to-radar interference between the first vehicle and the second vehicle; radar-to-communication interference between the first vehicle and the second vehicle; radar-to-radar interference between the first vehicle or the second vehicle and the one or more other vehicles of the plurality of vehicles; radar-to-communication interference between the first vehicle or the second vehicle and the one or more other vehicles of the plurality of vehicles; or any combination thereof.

Clause 14. The method of any of clauses 1 to 13, further comprising: allocating one or more resources for the one or more communication operations dynamically based on an amount of interference from the one or more sensing operations.

Clause 15. The method of clause 14, wherein allocating the one or more resources for the one or more communication operations comprises: tuning a physical resource block (PRB) allocation or a modulation and coding scheme (MCS) allocation for the one or more communication operations.

Clause 16. A method of performing one or more integrated sensing and communication (ISAC) operations at a vehicle, comprising: transmitting, to a network node, a scheduling request to perform one or more sensing operations, one or more communication operations, or a combination of the one or more sensing operations and the one or more communication operations; and receiving, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Clause 17. The method of clause 16, further comprising: transmitting, to the network node, a capability message indicating one or more radar parameters of the vehicle.

Clause 18. The method of clause 17, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 19. The method of any of clauses 17 to 18, wherein the capability message is transmitted through radio resource control (RRC) user equipment (UE) assistance information (UAI) or UE capability exchange.

Clause 20. The method of any of clauses 16 to 19, wherein the scheduling request includes: one or more beams to be used for radar sensing by one or more radar sensors of the vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 21. The method of any of clauses 16 to 20, wherein the configuration is received through downlink control information (DCI) or radio resource control (RRC) signaling.

Clause 22. A network node, comprising: one or more memories; one or more transceivers; and one or more processors communicatively coupled to the one or more memories and the one or more transceivers, the one or more processors, either alone or in combination, configured to: receive, via the one or more transceivers, from a road side unit (RSU), a plurality of basic safety messages (BSMs) transmitted by a plurality of vehicles; receive, via the one or more transceivers, from a first vehicle of the plurality of vehicles, a scheduling request to perform one or more sensing operations, one or more communication operations, or a combination of the one or more sensing operations and the one or more communication operations; and transmit, via the one or more transceivers, to the first vehicle, a first configuration to perform the one or more sensing operations, the one or more communication operations, or the combination based on the plurality of BSMs and one or more scheduling requests from one or more other vehicles of the plurality of vehicles.

Clause 23. The network node of clause 22, wherein the one or more processors, either alone or in combination, are further configured to: receive, via the one or more transceivers, from the first vehicle, a capability message indicating one or more radar parameters of the first vehicle.

Clause 24. The network node of clause 23, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 25. The network node of any of clauses 23 to 24, wherein the capability message is received through radio resource control (RRC) user equipment (UE) assistance information (UAI) or UE capability exchange.

Clause 26. The network node of any of clauses 22 to 25, wherein the scheduling request includes: one or more beams to be used for radar sensing by one or more radar sensors of the first vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 27. The network node of any of clauses 22 to 26, wherein the first configuration is transmitted through downlink control information (DCI) or radio resource control (RRC) signaling.

Clause 28. The network node of any of clauses 22 to 27, wherein the plurality of BSMs include kinematics information of the first vehicle, the one or more processors, either alone or in combination, are further configured to: receive, via the one or more transceivers, radar sensor information of the first vehicle; determine whether the first vehicle is permitted to perform the one or more sensing operations and the one or more communication operations simultaneously based on the kinematics information and the radar sensor information; and schedule the one or more sensing operations and the one or more communication operations simultaneously for the first vehicle based on a determination that the first vehicle is permitted to perform the one or more sensing operations and the one or more communication operations simultaneously.

Clause 29. The network node of clause 28, wherein the one or more processors, either alone or in combination, are further configured to: schedule the one or more sensing operations and the one or more communication operations at different times for the first vehicle based on a determination that the first vehicle is not permitted to perform the one or more sensing operations and the one or more communication operations simultaneously.

Clause 30. The network node of clause 29, wherein the one or more processors configured to schedule the one or more sensing operations and the one or more communication operations at different times comprise the one or more processors, either alone or in combination, configured to: perform intra-cell time division multiplexing (TDM) of the one or more sensing operations and the one or more communication operations.

Clause 31. The network node of any of clauses 28 to 30, wherein the one or more processors configured to determine whether the first vehicle is permitted to perform the one or more sensing operations and the one or more communication operations simultaneously comprise the one or more processors, either alone or in combination, configured to: determine a signal to interference and noise ratio (SINR) of one or more radar sensors of the first vehicle.

Clause 32. The network node of clause 31, wherein the one or more processors configured to determine whether the first vehicle is permitted to perform the one or more sensing operations and the one or more communication operations simultaneously comprise the one or more processors, either alone or in combination, configured to: determine one or more widths of one or more beams of the one or more radar sensors.

Clause 33. The network node of any of clauses 22 to 32, wherein the one or more processors, either alone or in combination, are further configured to: transmit, via the one or more transceivers, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

Clause 34. The network node of clause 33, wherein the spatial multiplexing is based on: radar-to-radar interference between the first vehicle and the second vehicle; radar-to-communication interference between the first vehicle and the second vehicle; radar-to-radar interference between the first vehicle or the second vehicle and the one or more other vehicles of the plurality of vehicles; radar-to-communication interference between the first vehicle or the second vehicle and the one or more other vehicles of the plurality of vehicles; or any combination thereof.

Clause 35. The network node of any of clauses 22 to 34, wherein the one or more processors, either alone or in combination, are further configured to: allocate one or more resources for the one or more communication operations dynamically based on an amount of interference from the one or more sensing operations.

Clause 36. The network node of clause 35, wherein the one or more processors configured to allocate the one or more resources for the one or more communication operations comprise the one or more processors, either alone or in combination, configured to: a physical resource block (PRB) allocation or a modulation and coding scheme (MCS) allocation for the one or more communication operations.

Clause 37. A vehicle, comprising: one or more memories; one or more transceivers; and one or more processors communicatively coupled to the one or more memories and the one or more transceivers, the one or more processors, either alone or in combination, configured to: transmit, via the one or more transceivers, to a network node, a scheduling request to perform one or more sensing operations, one or more communication operations, or a combination of the one or more sensing operations and the one or more communication operations; and receive, via the one or more transceivers, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Clause 38. The vehicle of clause 37, wherein the one or more processors, either alone or in combination, are further configured to: transmit, via the one or more transceivers, to the network node, a capability message indicating one or more radar parameters of the vehicle.

Clause 39. The vehicle of clause 38, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 40. The vehicle of any of clauses 38 to 39, wherein the capability message is transmitted through radio resource control (RRC) user equipment (UE) assistance information (UAI) or UE capability exchange.

Clause 41. The vehicle of any of clauses 37 to 40, wherein the scheduling request includes: one or more beams to be used for radar sensing by one or more radar sensors of the vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 42. The vehicle of any of clauses 37 to 41, wherein the configuration is received through downlink control information (DCI) or radio resource control (RRC) signaling.

Clause 43. A network node, comprising: means for receiving, from a road side unit (RSU), a plurality of basic safety messages (BSMs) transmitted by a plurality of vehicles; means for receiving, from a first vehicle of the plurality of vehicles, a scheduling request to perform one or more sensing operations, one or more communication operations, or a combination of the one or more sensing operations and the one or more communication operations; and means for transmitting, to the first vehicle, a first configuration to perform the one or more sensing operations, the one or more communication operations, or the combination based on the plurality of BSMs and one or more scheduling requests from one or more other vehicles of the plurality of vehicles.

Clause 44. The network node of clause 43, further comprising: means for receiving, from the first vehicle, a capability message indicating one or more radar parameters of the first vehicle.

Clause 45. The network node of clause 44, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 46. The network node of any of clauses 44 to 45, wherein the capability message is received through radio resource control (RRC) user equipment (UE) assistance information (UAI) or UE capability exchange.

Clause 47. The network node of any of clauses 43 to 46, wherein the scheduling request includes: one or more beams to be used for radar sensing by one or more radar sensors of the first vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 48. The network node of any of clauses 43 to 47, wherein the first configuration is transmitted through downlink control information (DCI) or radio resource control (RRC) signaling.

Clause 49. The network node of any of clauses 43 to 48, wherein the plurality of BSMs include kinematics information of the first vehicle, further comprising: means for receiving radar sensor information of the first vehicle; means for determining whether the first vehicle is permitted to perform the one or more sensing operations and the one or more communication operations simultaneously based on the kinematics information and the radar sensor information; and means for scheduling the one or more sensing operations and the one or more communication operations simultaneously for the first vehicle based on a determination that the first vehicle is permitted to perform the one or more sensing operations and the one or more communication operations simultaneously.

Clause 50. The network node of clause 49, further comprising: means for scheduling the one or more sensing operations and the one or more communication operations at different times for the first vehicle based on a determination that the first vehicle is not permitted to perform the one or more sensing operations and the one or more communication operations simultaneously.

Clause 51. The network node of clause 50, wherein the means for scheduling the one or more sensing operations and the one or more communication operations at different times comprises: means for performing intra-cell time division multiplexing (TDM) of the one or more sensing operations and the one or more communication operations.

Clause 52. The network node of any of clauses 49 to 51, wherein the means for determining whether the first vehicle is permitted to perform the one or more sensing operations and the one or more communication operations simultaneously comprises: means for determining a signal to interference and noise ratio (SINR) of one or more radar sensors of the first vehicle.

Clause 53. The network node of clause 52, wherein the means for determining whether the first vehicle is permitted to perform the one or more sensing operations and the one or more communication operations simultaneously further comprises: means for determining one or more widths of one or more beams of the one or more radar sensors.

Clause 54. The network node of any of clauses 43 to 53, further comprising: means for transmitting, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

Clause 55. The network node of clause 54, wherein the spatial multiplexing is based on: radar-to-radar interference between the first vehicle and the second vehicle; radar-to-communication interference between the first vehicle and the second vehicle; radar-to-radar interference between the first vehicle or the second vehicle and the one or more other vehicles of the plurality of vehicles; radar-to-communication interference between the first vehicle or the second vehicle and the one or more other vehicles of the plurality of vehicles; or any combination thereof.

Clause 56. The network node of any of clauses 43 to 55, further comprising: means for allocating one or more resources for the one or more communication operations dynamically based on an amount of interference from the one or more sensing operations.

Clause 57. The network node of clause 56, wherein the means for allocating the one or more resources for the one or more communication operations comprises: means for a physical resource block (PRB) allocation or a modulation and coding scheme (MCS) allocation for the one or more communication operations.

Clause 58. A vehicle, comprising: means for transmitting, to a network node, a scheduling request to perform one or more sensing operations, one or more communication operations, or a combination of the one or more sensing operations and the one or more communication operations; and means for receiving, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Clause 59. The vehicle of clause 58, further comprising: means for transmitting, to the network node, a capability message indicating one or more radar parameters of the vehicle.

Clause 60. The vehicle of clause 59, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 61. The vehicle of any of clauses 59 to 60, wherein the capability message is transmitted through radio resource control (RRC) user equipment (UE) assistance information (UAI) or UE capability exchange.

Clause 62. The vehicle of any of clauses 58 to 61, wherein the scheduling request includes: one or more beams to be used for radar sensing by one or more radar sensors of the vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 63. The vehicle of any of clauses 58 to 62, wherein the configuration is received through downlink control information (DCI) or radio resource control (RRC) signaling.

Clause 64. A non-transitory computer-readable medium stores computer-executable instructions that, when executed by a network node, cause the network node to: receive, from a road side unit (RSU), a plurality of basic safety messages (BSMs) transmitted by a plurality of vehicles; receive, from a first vehicle of the plurality of vehicles, a scheduling request to perform one or more sensing operations, one or more communication operations, or a combination of the one or more sensing operations and the one or more communication operations; and transmit, to the first vehicle, a first configuration to perform the one or more sensing operations, the one or more communication operations, or the combination based on the plurality of BSMs and one or more scheduling requests from one or more other vehicles of the plurality of vehicles.

Clause 65. The non-transitory computer-readable medium of clause 64, further comprising computer-executable instructions that, when executed by the network node, cause the network node to: receive, from the first vehicle, a capability message indicating one or more radar parameters of the first vehicle.

Clause 66. The non-transitory computer-readable medium of clause 65, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 67. The non-transitory computer-readable medium of any of clauses 65 to 66, wherein the capability message is received through radio resource control (RRC) user equipment (UE) assistance information (UAI) or UE capability exchange.

Clause 68. The non-transitory computer-readable medium of any of clauses 64 to 67, wherein the scheduling request includes: one or more beams to be used for radar sensing by one or more radar sensors of the first vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 69. The non-transitory computer-readable medium of any of clauses 64 to 68, wherein the first configuration is transmitted through downlink control information (DCI) or radio resource control (RRC) signaling.

Clause 70. The non-transitory computer-readable medium of any of clauses 64 to 69, wherein the plurality of BSMs include kinematics information of the first vehicle, further comprising computer-executable instructions that, when executed by the network node, cause the network node to: receive radar sensor information of the first vehicle; determine whether the first vehicle is permitted to perform the one or more sensing operations and the one or more communication operations simultaneously based on the kinematics information and the radar sensor information; and schedule the one or more sensing operations and the one or more communication operations simultaneously for the first vehicle based on a determination that the first vehicle is permitted to perform the one or more sensing operations and the one or more communication operations simultaneously.

Clause 71. The non-transitory computer-readable medium of clause 70, further comprising computer-executable instructions that, when executed by the network node, cause the network node to: schedule the one or more sensing operations and the one or more communication operations at different times for the first vehicle based on a determination that the first vehicle is not permitted to perform the one or more sensing operations and the one or more communication operations simultaneously.

Clause 72. The non-transitory computer-readable medium of clause 71, wherein the computer-executable instructions that, when executed by the network node, cause the network node to schedule the one or more sensing operations and the one or more communication operations at different times comprise computer-executable instructions that, when executed by the network node, cause the network node to: perform intra-cell time division multiplexing (TDM) of the one or more sensing operations and the one or more communication operations.

Clause 73. The non-transitory computer-readable medium of any of clauses 70 to 72, wherein the computer-executable instructions that, when executed by the network node, cause the network node to determine whether the first vehicle is permitted to perform the one or more sensing operations and the one or more communication operations simultaneously comprise computer-executable instructions that, when executed by the network node, cause the network node to: determine a signal to interference and noise ratio (SINR) of one or more radar sensors of the first vehicle.

Clause 74. The non-transitory computer-readable medium of clause 73, wherein the computer-executable instructions that, when executed by the network node, cause the network node to determine whether the first vehicle is permitted to perform the one or more sensing operations and the one or more communication operations simultaneously comprise computer-executable instructions that, when executed by the network node, cause the network node to: determine one or more widths of one or more beams of the one or more radar sensors.

Clause 75. The non-transitory computer-readable medium of any of clauses 64 to 74, further comprising computer-executable instructions that, when executed by the network node, cause the network node to: transmit, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

Clause 76. The non-transitory computer-readable medium of clause 75, wherein the spatial multiplexing is based on: radar-to-radar interference between the first vehicle and the second vehicle; radar-to-communication interference between the first vehicle and the second vehicle; radar-to-radar interference between the first vehicle or the second vehicle and the one or more other vehicles of the plurality of vehicles; radar-to-communication interference between the first vehicle or the second vehicle and the one or more other vehicles of the plurality of vehicles; or any combination thereof.

Clause 77. The non-transitory computer-readable medium of any of clauses 64 to 76, further comprising computer-executable instructions that, when executed by the network node, cause the network node to: allocate one or more resources for the one or more communication operations dynamically based on an amount of interference from the one or more sensing operations.

Clause 78. The non-transitory computer-readable medium of clause 77, wherein the computer-executable instructions that, when executed by the network node, cause the network node to allocate the one or more resources for the one or more communication operations comprise computer-executable instructions that, when executed by the network node, cause the network node to: a physical resource block (PRB) allocation or a modulation and coding scheme (MCS) allocation for the one or more communication operations.

Clause 79. A non-transitory computer-readable medium stores computer-executable instructions that, when executed by a vehicle, cause the vehicle to: transmit, to a network node, a scheduling request to perform one or more sensing operations, one or more communication operations, or a combination of the one or more sensing operations and the one or more communication operations; and receive, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

Clause 80. The non-transitory computer-readable medium of clause 79, further comprising computer-executable instructions that, when executed by the vehicle, cause the vehicle to: transmit, to the network node, a capability message indicating one or more radar parameters of the vehicle.

Clause 81. The non-transitory computer-readable medium of clause 80, wherein the one or more radar parameters include: a number of radar sensors; a location of each of one or more radar sensors; a transmit power of each of the one or more radar sensors; an angular coverage of each of the one or more radar sensors; a signal pattern of each of the one or more radar sensors; or any combination thereof.

Clause 82. The non-transitory computer-readable medium of any of clauses 80 to 81, wherein the capability message is transmitted through radio resource control (RRC) user equipment (UE) assistance information (UAI) or UE capability exchange.

Clause 83. The non-transitory computer-readable medium of any of clauses 79 to 82, wherein the scheduling request includes: one or more beams to be used for radar sensing by one or more radar sensors of the vehicle; one or more signal patterns of the one or more radar sensors; time duration needed for the radar sensing; periodicity of sweeping through the one or more beams; sequence of sweeping through the one or more beams; time needed on each of the one or more beams; a vehicle-to-everything (V2X) identification (ID); a V2X ID type; or any combination thereof.

Clause 84. The non-transitory computer-readable medium of any of clauses 79 to 83, wherein the configuration is received through downlink control information (DCI) or radio resource control (RRC) signaling.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A network node, comprising:

one or more memories;

one or more transceivers; and one or more processors communicatively coupled to the one or more memories and the one or more transceivers, the one or more processors, either alone or in combination, configured to:

receive, via the one or more transceivers, from a road side unit (RSU), a plurality of basic safety messages (BSMs) transmitted by a plurality of vehicles;

receive, via the one or more transceivers, from a first vehicle of the plurality of vehicles, a scheduling request to perform one or more sensing operations, one or more communication operations, or a combination of the one or more sensing operations and the one or more communication operations; and transmit, via the one or more transceivers, to the first vehicle, a first configuration to perform the one or more sensing operations, the one or more communication operations, or the combination based on the plurality of BSMs and one or more scheduling requests from one or more other vehicles of the plurality of vehicles.

2. The network node of claim 1, wherein the one or more processors, either alone or in combination, are further configured to:

receive, via the one or more transceivers, from the first vehicle, a capability message indicating one or more radar parameters of the first vehicle.

3. The network node of claim 2, wherein the one or more radar parameters include:

a number of radar sensors;

a location of each of one or more radar sensors;

a transmit power of each of the one or more radar sensors;

an angular coverage of each of the one or more radar sensors;

a signal pattern of each of the one or more radar sensors;

or any combination thereof.

4. The network node of claim 2, wherein the capability message is received through radio resource control (RRC) user equipment (UE) assistance information (UAI) or UE capability exchange.

5. The network node of claim 1, wherein the scheduling request includes:

one or more beams to be used for radar sensing by one or more radar sensors of the first vehicle;

one or more signal patterns of the one or more radar sensors;

time duration needed for the radar sensing;

periodicity of sweeping through the one or more beams;

sequence of sweeping through the one or more beams;

time needed on each of the one or more beams;

a vehicle-to-everything (V2X) identification (ID);

a V2X ID type;

or any combination thereof.

6. The network node of claim 1, wherein the first configuration is transmitted through downlink control information (DCI) or radio resource control (RRC) signaling.

7. The network node of claim 1, wherein the plurality of BSMs include kinematics information of the first vehicle, and the one or more processors, either alone or in combination, are further configured to:

receive, via the one or more transceivers, radar sensor information of the first vehicle;

determine whether the first vehicle is permitted to perform the one or more sensing operations and the one or more communication operations simultaneously based on the kinematics information and the radar sensor information; and schedule the one or more sensing operations and the one or more communication operations simultaneously for the first vehicle based on a determination that the first vehicle is permitted to perform the one or more sensing operations and the one or more communication operations simultaneously.

8. The network node of claim 7, wherein the one or more processors, either alone or in combination, are further configured to:

schedule the one or more sensing operations and the one or more communication operations at different times for the first vehicle based on a determination that the first vehicle is not permitted to perform the one or more sensing operations and the one or more communication operations simultaneously.

9. The network node of claim 8, wherein the one or more processors configured to schedule the one or more sensing operations and the one or more communication operations at different times comprise the one or more processors, either alone or in combination, configured to:

perform intra-cell time division multiplexing (TDM) of the one or more sensing operations and the one or more communication operations.

10. The network node of claim 7, wherein the one or more processors configured to determine whether the first vehicle is permitted to perform the one or more sensing operations and the one or more communication operations simultaneously comprise the one or more processors, either alone or in combination, configured to:

determine a signal to interference and noise ratio (SINR) of one or more radar sensors of the first vehicle.

11. The network node of claim 10, wherein the one or more processors configured to determine whether the first vehicle is permitted to perform the one or more sensing operations and the one or more communication operations simultaneously comprise the one or more processors, either alone or in combination, configured to:

determine one or more widths of one or more beams of the one or more radar sensors.

12. The network node of claim 1, wherein the one or more processors, either alone or in combination, are further configured to:

transmit, via the one or more transceivers, to a second vehicle of the plurality of vehicles, a second configuration to perform the one or more sensing operations, the one or more communication operations, or the combination based on the plurality of BSMs and one or more scheduling requests from one or more other vehicles of the plurality of vehicles, based on a spatial multiplexing of the one or more sensing operations or the one or more communication operations by the first vehicle and the one or more sensing operations or the one or more communication operations by the second vehicle.

13. The network node of claim 12, wherein the spatial multiplexing is based on:

radar-to-radar interference between the first vehicle and the second vehicle;

radar-to-communication interference between the first vehicle and the second vehicle;

radar-to-radar interference between the first vehicle or the second vehicle and the one or more other vehicles of the plurality of vehicles;

radar-to-communication interference between the first vehicle or the second vehicle and the one or more other vehicles of the plurality of vehicles;

or any combination thereof.

14. The network node of claim 1, wherein the one or more processors, either alone or in combination, are further configured to:

allocate one or more resources for the one or more communication operations dynamically based on an amount of interference from the one or more sensing operations.

15. The network node of claim 14, wherein the one or more processors configured to allocate the one or more resources for the one or more communication operations comprise the one or more processors, either alone or in combination, configured to:

perform a physical resource block (PRB) allocation or a modulation and coding scheme (MCS) allocation for the one or more communication operations.

16. A vehicle, comprising:

one or more memories;

one or more transceivers; and one or more processors communicatively coupled to the one or more memories and the one or more transceivers, the one or more processors, either alone or in combination, configured to:

transmit, via the one or more transceivers, to a network node, a scheduling request to perform one or more sensing operations, one or more communication operations, or a combination of the one or more sensing operations and the one or more communication operations; and receive, via the one or more transceivers, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

17. The vehicle of claim 16, wherein the one or more processors, either alone or in combination, are further configured to:

transmit, via the one or more transceivers, to the network node, a capability message indicating one or more radar parameters of the vehicle.

18. The vehicle of claim 17, wherein the one or more radar parameters include:

a number of radar sensors;

a location of each of one or more radar sensors;

a transmit power of each of the one or more radar sensors;

an angular coverage of each of the one or more radar sensors;

a signal pattern of each of the one or more radar sensors;

or any combination thereof.

19. The vehicle of claim 17, wherein the capability message is transmitted through radio resource control (RRC) user equipment (UE) assistance information (UAI) or UE capability exchange.

20. The vehicle of claim 16, wherein the scheduling request includes:

one or more beams to be used for radar sensing by one or more radar sensors of the vehicle;

one or more signal patterns of the one or more radar sensors;

time duration needed for the radar sensing;

periodicity of sweeping through the one or more beams;

sequence of sweeping through the one or more beams;

time needed on each of the one or more beams;

a vehicle-to-everything (V2X) identification (ID);

a V2X ID type;

or any combination thereof.

21. The vehicle of claim 16, wherein the configuration is received through downlink control information (DCI) or radio resource control (RRC) signaling.

22. A method of configuring vehicle sensing and communication at a network node, comprising:

receiving, from a road side unit (RSU), a plurality of basic safety messages (BSMs) transmitted by a plurality of vehicles;

receiving, from a first vehicle of the plurality of vehicles, a scheduling request to perform one or more sensing operations, one or more communication operations, or a combination of the one or more sensing operations and the one or more communication operations; and transmitting, to the first vehicle, a first configuration to perform the one or more sensing operations, the one or more communication operations, or the combination based on the plurality of BSMs and one or more scheduling requests from one or more other vehicles of the plurality of vehicles.

23. The method of claim 22, further comprising:

receiving, from the first vehicle, a capability message indicating one or more radar parameters of the first vehicle.

24. The method of claim 23, wherein the one or more radar parameters include:

a number of radar sensors;

a location of each of one or more radar sensors;

a transmit power of each of the one or more radar sensors;

an angular coverage of each of the one or more radar sensors;

a signal pattern of each of the one or more radar sensors;

or any combination thereof.

25. The method of claim 23, wherein the capability message is received through radio resource control (RRC) user equipment (UE) assistance information (UAI) or UE capability exchange.

26. The method of claim 22, wherein the scheduling request includes:

one or more beams to be used for radar sensing by one or more radar sensors of the first vehicle;

one or more signal patterns of the one or more radar sensors;

time duration needed for the radar sensing;

periodicity of sweeping through the one or more beams;

sequence of sweeping through the one or more beams;

time needed on each of the one or more beams;

a vehicle-to-everything (V2X) identification (ID);

a V2X ID type;

or any combination thereof.

27. A method of performing one or more integrated sensing and communication (ISAC) operations at a vehicle, comprising:

transmitting, to a network node, a scheduling request to perform one or more sensing operations, one or more communication operations, or a combination of the one or more sensing operations and the one or more communication operations; and receiving, from the network node, a configuration to perform the one or more sensing operations, the one or more communication operations, or the combination based at least in part on a plurality of basic safety messages (BSMs) transmitted by a plurality of vehicles received by the network node from a road side unit (RSU) and one or more scheduling requests from one or more other vehicles of the plurality of vehicles.

28. The method of claim 27, further comprising:

transmitting, to the network node, a capability message indicating one or more radar parameters of the vehicle.

29. The method of claim 28, wherein the one or more radar parameters include:

a number of radar sensors;

a location of each of one or more radar sensors;

a transmit power of each of the one or more radar sensors;

an angular coverage of each of the one or more radar sensors;

a signal pattern of each of the one or more radar sensors;

or any combination thereof.

30. The method of claim 28, wherein the capability message is transmitted through radio resource control (RRC) user equipment (UE) assistance information (UAI) or UE capability exchange.

* * * * *